United States Patent [19]
Koike

[11] Patent Number: 6,134,055
[45] Date of Patent: Oct. 17, 2000

[54] OBJECTIVE LENS AND OPTICAL PICKUP DEVICE

[75] Inventor: Katsuhiro Koike, Saitama, Japan

[73] Assignee: Pioneer Electronic Corporation, Tokyo, Japan

[21] Appl. No.: 09/280,719

[22] Filed: Mar. 30, 1999

[30] Foreign Application Priority Data

Mar. 31, 1998 [JP] Japan .................................. 10-104009

[51] Int. Cl.[7] .................................................. G02B 13/00
[52] U.S. Cl. ........................ 359/724; 359/719; 359/721; 359/738; 359/741; 359/743; 359/565; 250/201.5; 369/44.23; 369/44.24
[58] Field of Search ..................................... 359/457, 619, 359/648, 719, 721, 724, 738, 743, 742, 741, 565; 250/201.5, 201.2; 369/44.23, 44.24

[56] References Cited

U.S. PATENT DOCUMENTS

| 4,210,391 | 7/1980 | Cohen | 359/743 |
|---|---|---|---|
| 4,340,283 | 7/1982 | Cohen | 359/743 |
| 4,936,665 | 6/1990 | Whitney | 359/724 |
| 4,995,714 | 2/1991 | Cohen | 359/721 |
| 4,995,715 | 2/1991 | Cohen | 359/721 |
| 5,017,000 | 5/1991 | Cohen | 359/721 |
| 5,117,306 | 5/1992 | Cohen | 359/565 |
| 5,665,957 | 9/1997 | Lee et al. | 250/201.5 |
| 5,777,803 | 7/1998 | Ju et al. | 359/719 |
| 5,835,283 | 11/1998 | Yamanaka | 359/719 |
| 5,969,862 | 10/1999 | Maruyama | 359/565 |

*Primary Examiner*—Loha Ben
*Attorney, Agent, or Firm*—Morgan, Lewis & Bockius LLP

[57] ABSTRACT

An objective lens for condensing a light beam, has at least one of annular grooves and ridges producing a phase difference. Each of the annular groove and ridge is formed concentrically on at least one of an incident surface which said light beam is introduced, and an emission surface which said light beam is emitted.

22 Claims, 35 Drawing Sheets

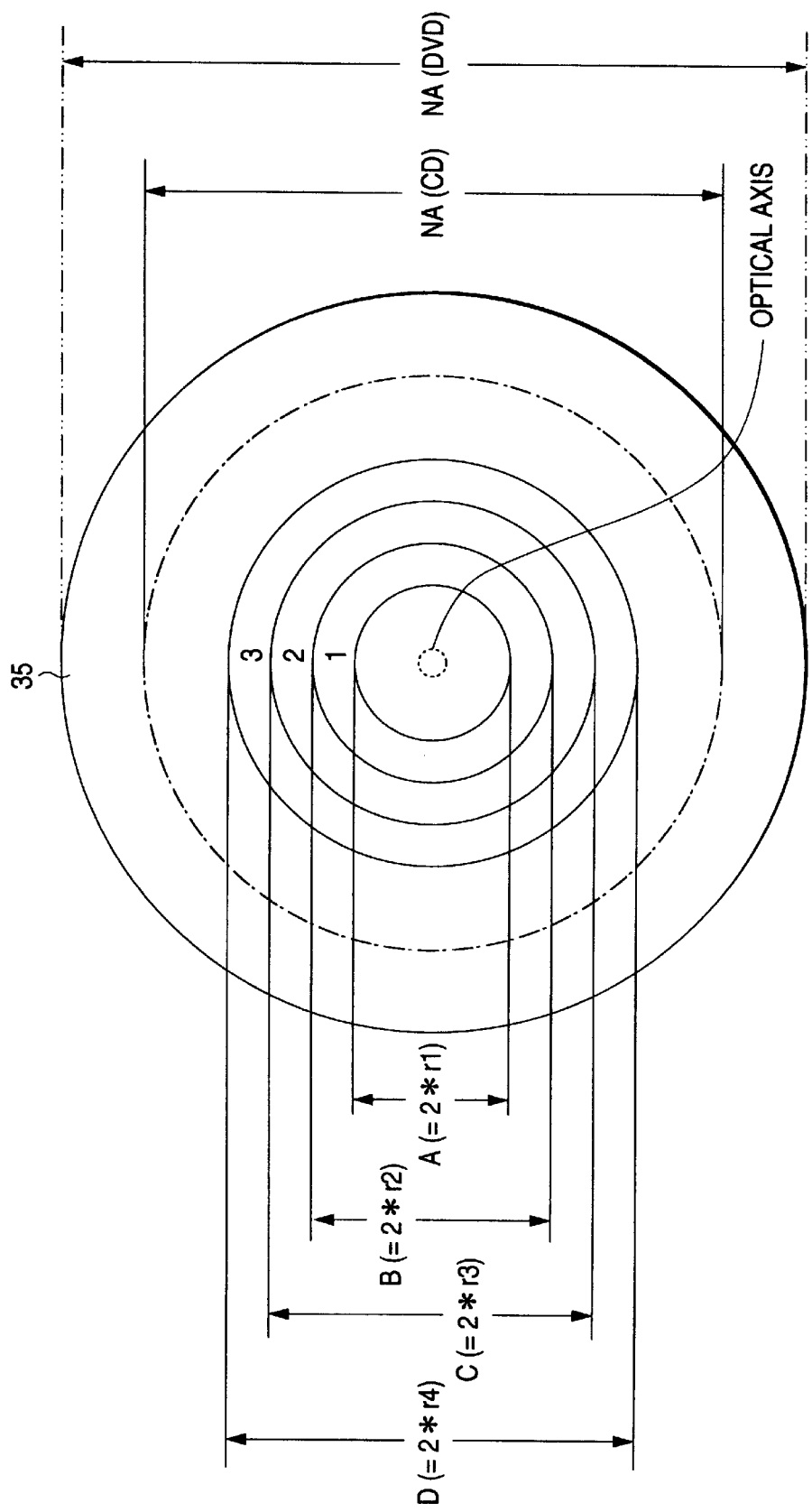

OPTICAL AXIS

OPTICAL AXIS

RMS OPD = 0.008λ

RMS OPD = 0.14λ

OBJECTIVE LENS AND OPTICAL PICKUP DEVICE

BACKGROUND OF THE INVENTION

1. Field of the Invention

The present invention relates to the technical field of objective lenses for use in optical pickup devices with which optical discs having different conditions on parameters such as substrate thickness and recording density are compatibly used in reproducing or recording information. The invention also relates to the technical field of the optical pickup devices.

2. Description of the Related Art

Optical recording and reproducing apparatus include optical disc players that read recorded information from optical discs used as optical information recording media. Exemplary optical discs include a LD (laser disc), a CD (compact disc) and a DVD (digital video disc or digital versatile disc). A compatible disc player can read information from a plurality of kinds of optical discs. Optical pickups used in a compatible disc player have an optical system that allows a light beam to illuminate the optical disc and which reads the return light from the optical disc.

Different optical discs are designed to have different specifications in various factors such as numerical aperture (NA), substrate thickness and optimal wavelength for reading light. Therefore, in order to realize an optical pickup suitable for use in a CD/DVD compatible player, the differences in at least two factors, i.e., numerical aperture (NA) and substrate thickness, must be corrected. The numerical aperture is 0.45 for the CD and 0.6 for the DVD whereas the substrate thickness is 1.2 mm for CDs and 0.6 mm for the DVD.

Consider the case where an objective lens primarily designed for the DVD is applied as a common lens which reproduces information from both the DVD and the CD using a light source with a wavelength of 650 nm for the DVD and a light source of 780 nm for the CD. The optical path in the case of reproducing information from the DVD is as shown in FIG. 34A and the aberration that occurs on the recording surface is negligible as shown in FIG. 35A. On the other hand, the optical path in the case of reproducing information from the CD is as shown in FIG. 34B and the aberration as shown in FIG. 35B occurs on the recording surface. This aberration is due to the difference in substrate thickness. In FIG. 34B, rays of incident light that pass through the marginal portion of the objective lens are greatly defocused, so as to produce only small effects on the characteristics of information reproduction from the CD. Hence, FIG. 34B shows only the optical path within the region of numerical aperture (NA) that affects the characteristics of information reproduction from the CD.

The vertical axis of the graphs shown in FIGS. 35A and 35B represents the aberration normalized by wavelength (to make 650 nm equal to one in FIG. 35A and 780 nm equal to one in FIG. 35B) whereas the horizontal axis represents the diameter of the objective lens (i.e., radial position from the optical axis).

In order to correct the aberration, two methods are currently used, one of which depends on a bifocal objective lens using a hologram and the other depends on two objective lenses having different focal lengths which are selectively operated for reading information from the DVD or the CD. However, the bifocal objective lens using a hologram is difficult to manufacture and subject to a loss in the quantity of light. The selective use of two objective lenses requires a bulky pickup and incurs a substantial cost.

SUMMARY OF THE INVENTION

The present invention has been accomplished under these circumstances and has an object providing a single common objective lens capable of reproducing information from at least two recording media having different specifications. Further, another object of the invention is to provide an optical pickup device equipped with the objective lens.

To solve the first object of the invention, the present invention is characterized by the following features.

(1) An objective lens for condensing a light beam, has at least one of the combination of an annular groove and an annular ridge, the combination of the annular grooves, and the combination of the annular ridges, said annular groove and ridge producing a phase difference, each of which is formed concentrically on at least one of an incident surface through which the light beam is introduced, and an emission surface through which the light beam is emitted.

(2) The objective lens according to (1), wherein the annular grooves and ridges are respectively provided only on the incident surface of the objective lens.

(3) The objective lens according to (1), wherein the annular grooves and ridges are respectively provided only on the emission surface of the objective lens.

(4) The objective lens according to (1), wherein the annular grooves and ridges are provided on both the incident surface and the emission surface of the objective lens.

(5) The objective lens according to (1), wherein the annular groove is defined by an outer side surface, an inner side surface, and a bottom surface, the outer and inner side surfaces are parallel with an optical axis of the objective lens, and the radius of the curvature of the bottom surface is the same as that of the surface on which the annular groove is provided.

(6) The objective lens according to (1), wherein the annular ridge is defined by an outer side surface, an inner side surface, and a top surface, the outer and inner side surfaces are parallel with an optical axis of the objective lens, and the radius of the curvature of the top surface is the same as that of the surface on which the annular ridge is provided.

(7) The objective lens according to (1), wherein the depth h of the annular groove and the height h of the annular ridge are respectively given by:

$$h = m\lambda/(n1-1)$$

where m is a natural number, $\lambda$ is the wavelength of the light beam, and n1 is the refractive index of the objective lens.

(8) The objective lens according to (1), wherein the objective lens having at least one of the annular grooves and ridges is formed by a single member.

(9) The objective lens according to (1), wherein the objective lens includes a first member having an uninterrupted incident and emission surfaces, and a second member to be attached to the first member so as to form the annular groove and ridge respectively, and the second member has the same material as the first member.

The objective lenses according to (1) to (9) have at least one of annular grooves and ridges formed concentrically on the incident surface and the emission surface, so the light beam passing through the objective lens creates a phase difference depending on the region of its passage.

To solve the second object of the invention, the present invention is characterized by the following features.

(10) An optical pickup device includes:

a first light source having a first wavelength for reading information from a first optical recording medium, the first optical recording medium having a first distance from a front surface to an information recording surface;

a second light source having a second wavelength longer than the first wavelength for reading information from a second optical recording medium, the second optical recording medium having a second distance from a front surface to an information recording surface, which is different from the first distance; and an objective lens defined on the basis of a predetermined effective numerical aperture and a predetermined focal position for reading information from the first optical recording medium, the objective lens having at least one of the combination of an annular groove and an annular ridge, the combination of said annular grooves, and the combination of said annular ridges, said annular groove and ridge producing a phase difference, each of which is formed concentrically on at least one of an incident surface through which the light beams from the light sources are introduced, and an emission surface through which the light beam introduced into the objective lens is emitted.

(11) The optical pickup device according to (10), wherein the annular grooves and ridges provided on the incident surface of the objective lens are formed within the diameter of a region in the incident surface corresponding to a predetermined effective numerical aperture for reading information from the second optical recording medium when the light beam from the second light source is introduced into the objective lens.

(12) The optical pickup device according to (10), wherein the annular grooves and ridges provided on the emission surface of the objective lens are formed within the diameter of a region in the emission surface which emits the light beam passing through the limit of the diameter of a region in the incident surface corresponding to a predetermined effective numerical aperture for reading information from the second optical recording medium when the light beam from the second light source is introduced into the objective lens.

(13) The objective lens according to (10), wherein the annular grooves and ridges are respectively provided only on the incident surface of the objective lens.

(14) The objective lens according to (10), wherein the annular grooves and ridges are respectively provided only on the emission surface of the objective lens.

(15) The objective lens according to (10), wherein the annular grooves and ridges are provided on both the incident surface and the emission surface of the objective lens.

(16) The optical pickup device according to (10), wherein the depth h of the annular groove and the height h of the annular ridge are respectively given by:

$$h = m\lambda/(n1-1)$$

where m is a natural number, $\lambda$ is the first wavelength, and n1 is the refractive index of the objective lens.

The optical pickup devices recited in (10) to (16) are such that the objective lens used has at least one of annular grooves and ridges formed concentrically on the incident surface and the emission surface, so the light beam passing through the objective lens creates a phase difference depending on the region of its passage. In addition, the depths or heights of the annular grooves and ridges are set to be such that they are substantially equal to integral multiples of the first wavelength. Accordingly, for example, the aberrations according to information to be reproduced from a CD can be suppressed without sacrificing the characteristics of information reproduction from a DVD.

BRIEF DESCRIPTION OF THE DRAWINGS

FIG. 4 shows the objective lens when viewed from a direction of an optical axis according to the first embodiment;

DETAILED DESCRIPTION OF THE PREFERRED EMBODIMENTS

Figure 1:
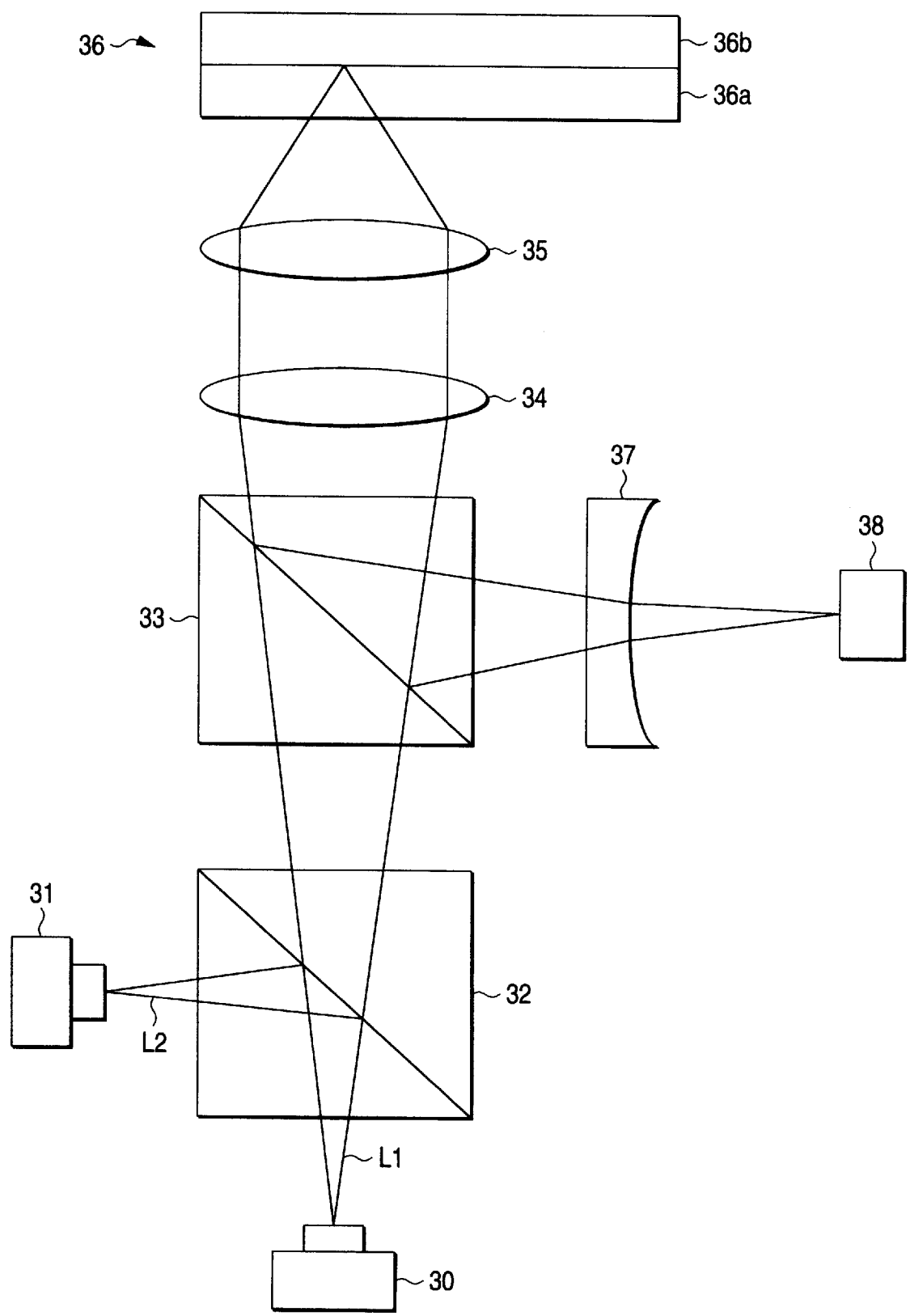
FIG. 1 is the general view of an optical system according to various embodiments of the invention.

FIG. 1 shows a general configuration of an optical pickup device according to various embodiments of the invention. The layout of the optical pickup device is described below with reference to FIG. 1.

The optical pickup device according to the invention includes, a first semiconductor laser 30 as a first light source that emits a first light beam having a first wavelength near 650 nm, a second semiconductor laser 31 as a second light source that emits a second light beam having a second wavelength near 780 nm, a dichroic mirror 32, a half-mirror 33, a collimator lens 34, an objective lens 35, a multiple lens 37 and a photodetector 38.

Firstly, suppose the case where a DVD which is an optical recording medium having a first distance (about 0.6 mm) from the front surface to the information recording surface is set up as an optical disc 36 on the disc placement position (not shown). A light beam L1 issuing from the first semiconductor laser 30 passes through the dichroic mirror 32 and the half-mirror 33 and further is introduced into the objective lens 35 after converting the light beam L1 to parallel light by means of the collimator lens 34.

The light beam L1 incident on the objective lens 35 is condensed by the objective lens 35 and the condensed light beam is irradiated on the information recording surface (say, 36a) of the DVD.

The light beam L1 reflected from the information recording surface 36a of the DVD passes through the objective lens 35 and the collimator lens 34 to be reflected by the half-mirror 33. The light beam L1 reflected from the half-mirror 33 passes through the multiple lenses 37 to be irradiated on the photodetector 38.

Next, suppose the case where a CD or CD-R which is an optical recording medium having a second distance from the front surface to the information recording surface (about 1.2 mm) is set up as the optical disc 36 on the disc placement position (not shown). A light beam L2 issuing from the second semiconductor laser 31 is reflected by the dichroic mirror 32 and passes through the half-mirror 33 and is introduced into the objective lens 35 after converting the light beam L2 to parallel light by means of the collimator lens 34.

The light beam L2 incident on the objective lens 35 is condensed by the objective lens 35 and the condensed light beam L2 is irradiated on the information recording surface (say, 36b) of the CD or CD-R.

The light beam L2 reflected from the information recording surface 36b of the CD or CD-R passes through the objective lens 35 and the collimator lens 34 to be reflected by the half-mirror 33. The light beam L2 reflected from the half-mirror 33 passes through the multiple lenses 37 to be irradiated on the photodetector 38.

As described above, the optical pickup device is constructed and operated.

Figure 2:
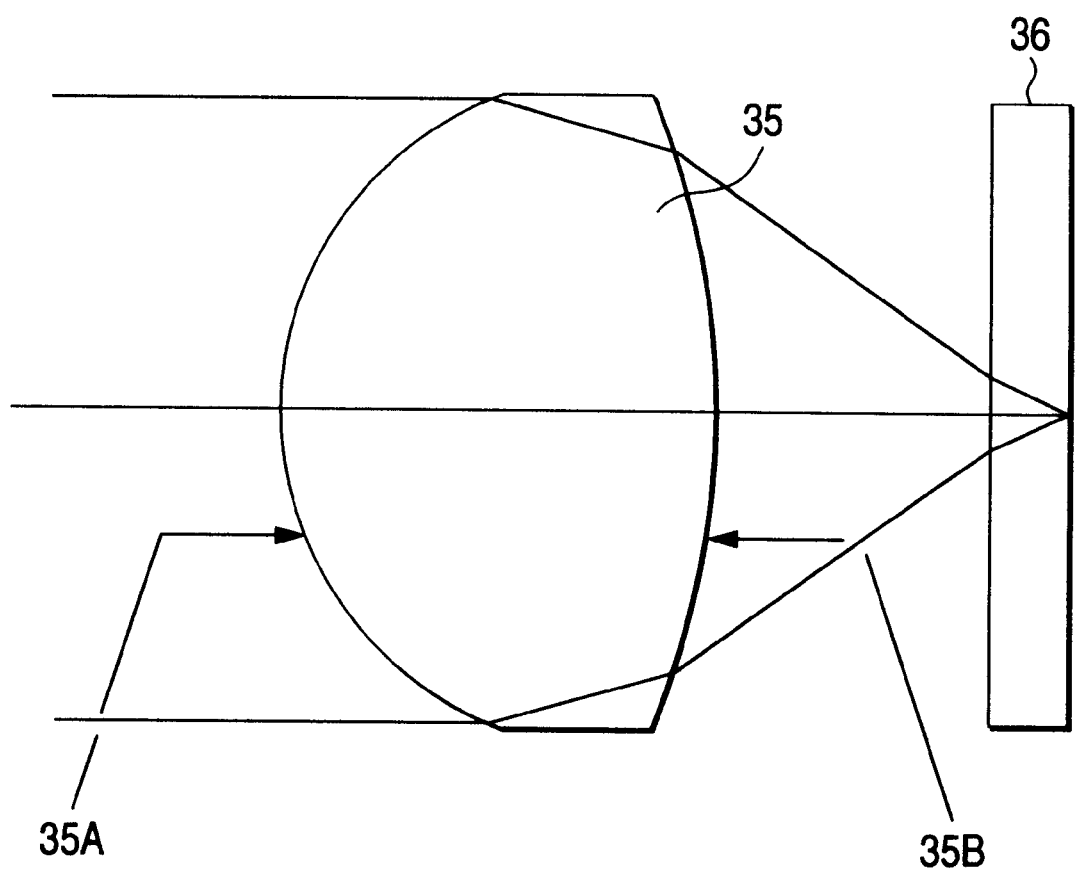
FIG. 2 shows an outline of an objective lens of the invention.

The objective lens 35 used in the optical pickup device which is the most characterizing part of the present invention will now be described with reference to FIG. 2.

The objective lens 35 of the invention has a refractive surface 35A (which is hereinafter refereed to as the "first surface") and another refractive surface 35B (hereinafter referred to as the "second surface") each of which has the diameter of a region corresponding to an overall numerical aperture of 0.6 at the wavelength of 650 nm for DVD. For convenience of explanation, the embodiment assumes that the objective lens has an effective diameter of 2.00 mm and a focal distance of 3.3 mm.

According to the invention, the above-described objective lens 35 having its first surface 35A and/or second surface 35B set to be optimal for reproducing information from a DVD is adapted to be such that annular grooves and/or ridges are formed in specified areas of the first surface and/or second surface in order to ensure that aberrations are suppressed in information reproduction not only from a DVD but also from a CD.

The preferred first to sixth embodiments of the invention are described in detail as belows.

Of the six embodiments, the first to four embodiments show the case of forming annular grooves and/or ridges only on the first surface 35A. The fifth embodiment shows the case of providing annular grooves only on the second surface 35B. The sixth embodiment shows the case of forming annular grooves on both the first surface 35A and the second surface 35B.

In each of the embodiments, the conditions for recording and reproducing information from a DVD are a wavelength of 650 nm, a numerical aperture (NA) of 0.6 and a substrate thickness of 0.6 mm, and the conditions for recording and reproducing information from a CD and a CD-R are a wavelength of 780 nm, a numerical aperture (NA) of 0.45 and a substrate thickness of 1.2 mm.

(First Embodiment)

In the first embodiment, the objective lens 35 basically set for a DVD is applied to reproduce information from a CD with the following design. The position of the objective lens as calculated from the CD's recording surface is set to coincide with the position where minimal RMS aberrations occur in the region with NA=0.45. In addition, the surface geometry of the objective lens is improved so as to achieve a further decrease in the RMS aberrations at the above position.

Figure 3A:
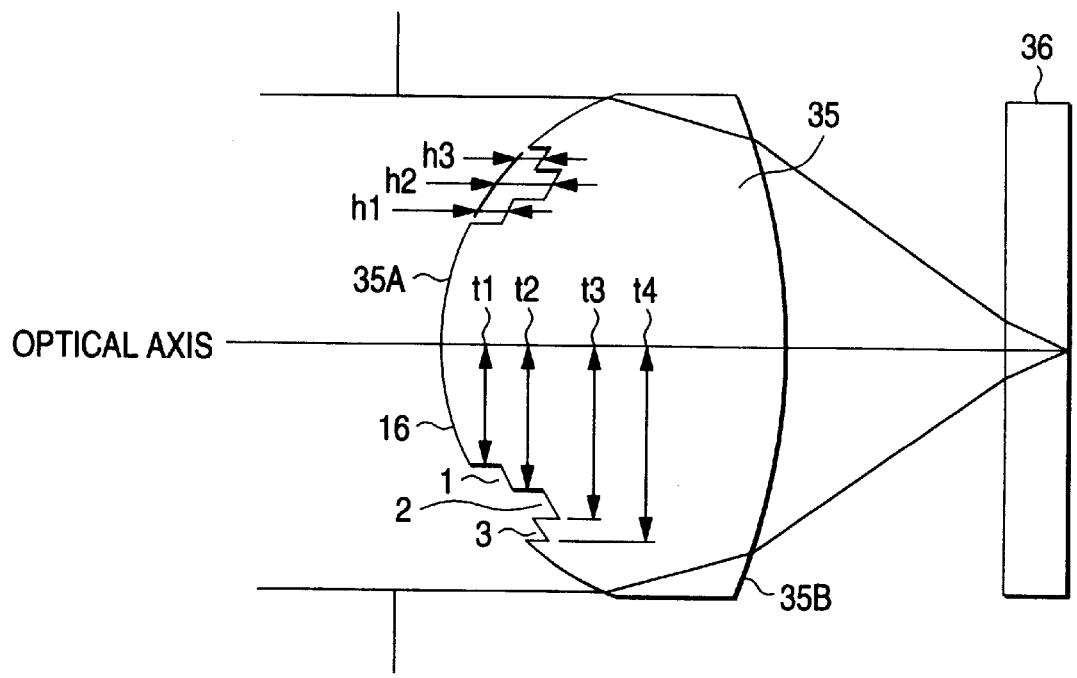
FIGS. 3A and 3B show the objective lens according to a first embodiment of the invention.
Figure 3B:
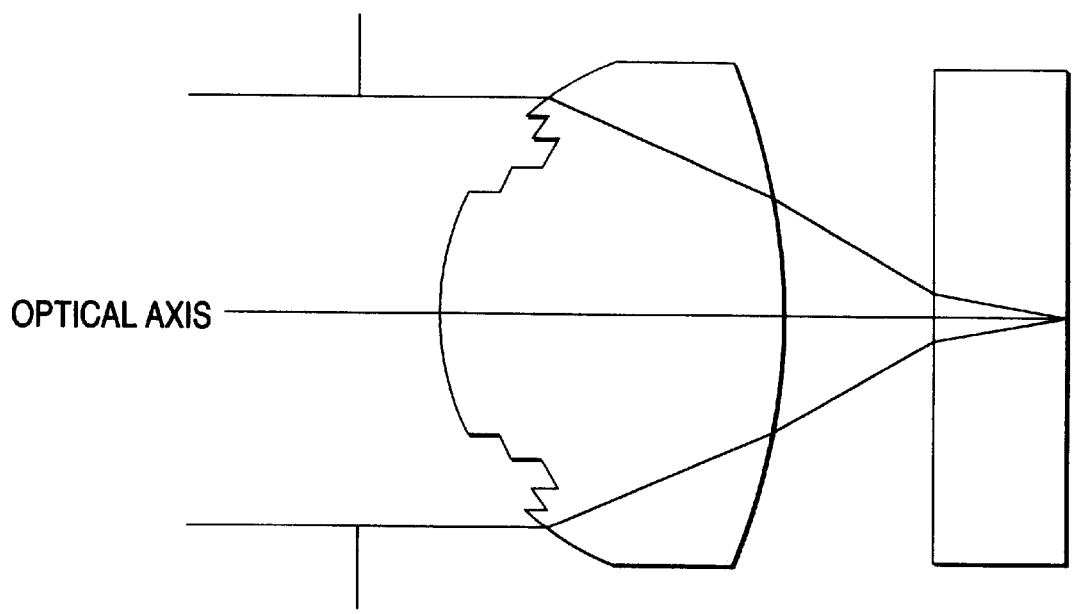

FIGS. 3A and 3B show the objective lens in the first embodiment of the invention. FIG. 3A shows the optical path of a wavelength of 650 nm to reproduce information from a DVD. FIG. 3B shows the optical path of a wavelength of 780 nm to reproduce information from a CD. Note that the optical path for reproducing information from a CD is under the same conditions as in the related art.

The objective lens indicated by 35 in FIG. 3A is a convex condenser lens having the following three annular grooves on the first surface 35A that are concentric about the optical axis: the first annular groove 1 having a radius of r1 on the inner circumference, a radius of r2 on the outer circumference and a depth of h1; the second annular groove 2 having a radius of r2 on the inner circumference, a radius of r3 on the outer circumference and a depth of h2; and the third annular groove 3 having a radius of r3 on the inner circumference, a radius of r4 on the outer circumference and a depth of h3. Each of the annular grooves 1, 2 and 3 has its bottom moved from the first surface 35A by translation and, hence, its bottom is a refractive surface having the same radius of curvature as the first surface 35A.

The annular grooves can be formed uniformly by a suitable method such as etching and the circumference of each groove can be formed uniformly on the surface of a glass lens element by a suitable method such as the transfer of a thin film as by the 2P process.

FIG. 4 shows the objective lens 35 when viewed from a direction of the optical axis according to the first embodiment. The diameters of the various regions of the objective lens 35 are indicated in FIG. 4. Specifically, NA (DVD) designates the diameter of a region corresponding to an effective numerical aperture (say, 0.6) that affects the characteristics of information reproduction from a DVD; NA (CD) designates the diameter of a region corresponding to an effective numerical aperture (say, 0.45) that affects the characteristics of information reproduction from a CD; A designates the diameter corresponding to the inside diameter of the first annular groove 1; B designates the diameter corresponding to the inside diameter of the second annular groove 2; C designates the diameter corresponding to the inside diameter of the third annular groove 3; and D designates the diameter corresponding to the outside diameter of the third annular groove 3.

In the first embodiment, the position of the objective lens 35 as calculated from the recording surface of the recording medium 36 is set in such a way that when it is used to reproduce information from a CD, rays of light that pass through its marginal portion (such as a region having an effective numerical aperture greater than 0.45) will be greatly defocused. This means that rays passing through the marginal portion of the objective lens 35 have only small effects on the characteristics of information reproduction from a CD. Therefore, the invention is to determine the number of annular grooves, as well as their positions and depths so as to ensure that smaller aberrations will occur within the region of NA (CD) corresponding to the numerical aperture that affects the characteristics of information reproduction from a CD.

In the first embodiment, the radii and depths of the annular grooves 1 to 3 on the objective lens 35 are set at the values shown in the following Table 3.

TABLE 3

Data on the annular grooves in the first embodiment

| | Radius of inner circumference, mm | Radius of outer circumference, mm | Depth of groove, $\mu$m |
| --- | --- | --- | --- |
| First ring 1 | 0.468 (r1) | 0.700 (r2) | 1.36 (h1) |
| Second ring 2 | 0.700 (r2) | 1.274 (r3) | 2.72 (h2) |
| Third ring 3 | 1.274 (r3) | 1.408 (r4) | 1.36 (h3) |

In Table 3, the depths h of the three annular grooves 1, 2 and 3 are set at such values that the difference in optical pathlength between an area that does not have any annular groove and an area where an annular groove is formed is substantially equal to an integral multiple of the wavelength for information reproduction from a DVD.

Stated more specifically, the difference in optical pathlength L between an area that does not have any annular groove and an area where an annular groove is formed is given by:

$$L = n1 \times h - 1 \times h \qquad \text{Eq. 1}$$
$$= (n1-1)h$$

where n1 is the refractive index of the objective lens and 1 is the refractive index of air.

Since the difference in optical pathlength is set to approximate an integral multiple of the wavelength for information reproduction from a DVD, the above equation can be rewritten as:

$$(n1-1)h \approx m\lambda \qquad \text{Eq. 2}$$
$$h \approx m\lambda/(n1-1)$$

where m is a natural number and $\lambda$ is the wavelength for information reproduction from a DVD.

Substituting $\lambda$=650 nm and the refractive index of the refractive surface 35A, n1=1.49966 into Eq. 2 gives:

$$h \approx m \times 650 \text{ [nm]}/(1.49966-1) \qquad \text{Eq. 3}$$
$$m \times 1.3 \text{ [}\mu m\text{]}$$

where m is a natural number.

This value gives a setting of the depth h of an individual annular groove.

Figure 5A:
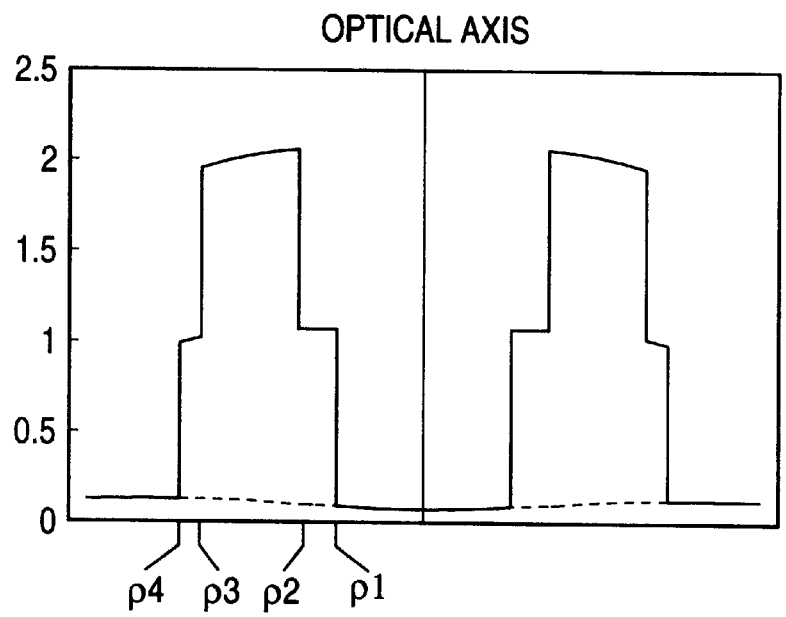
FIGS. 5A and 5B show the aberration characteristics of the objective lens according to the first embodiment.
Figure 5B:
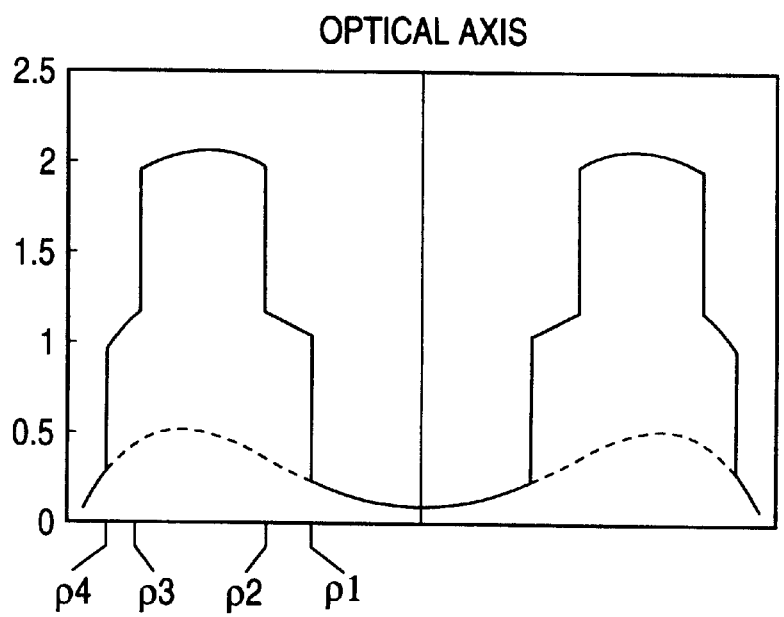
Figure 35A:
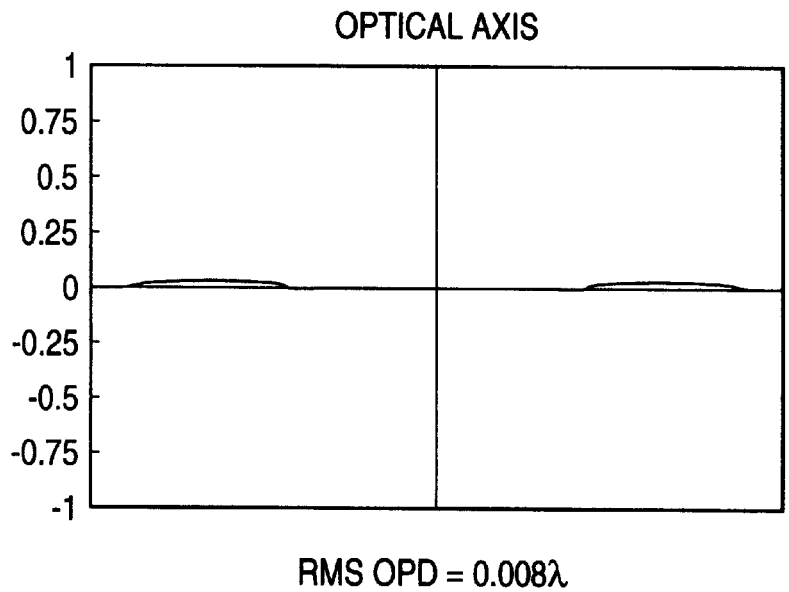
FIGS. 35A and 35B show the aberration characteristics of the related objective lens.
Figure 35B:
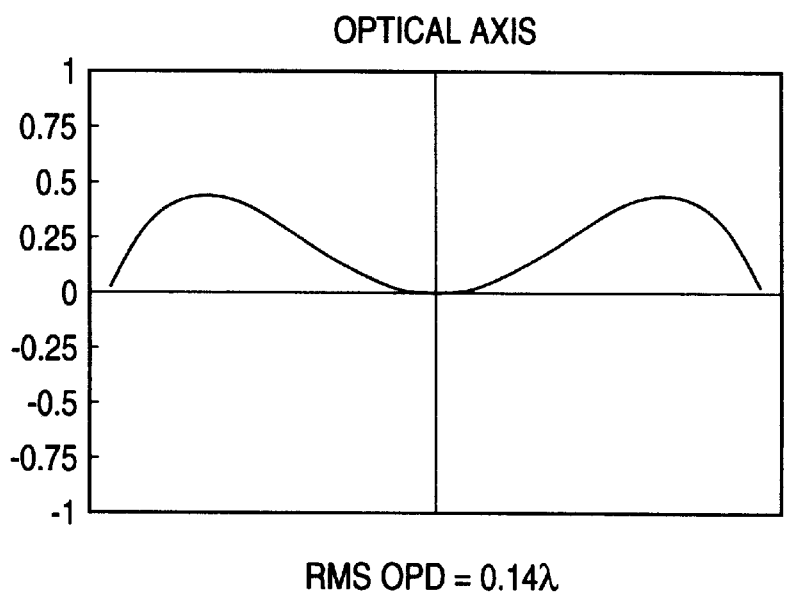

FIGS. 5A and 5B show the aberrations that occur when the objective lens according to the first embodiment is applied (as indicated by solid lines) and the aberrations that occur from the related objective lens for a DVD (as indicated by dashed lines). The vertical and horizontal axes of the graphs in FIGS. 5A and 5B represent the same axis as with FIG. 35 which was explained in connection with the related art.

FIG. 5A shows both the aberration that occurs when information is reproduced from a DVD with the objective lens of the first embodiment (as indicated by solid lines) and the aberration that occurs when information is reproduced from a DVD with the related objective lens for DVD which has no annular grooves (as indicated by dashed lines). FIG. 5B shows both the aberration that occurs when information is reproduced from a CD with the objective lens of the first embodiment (as indicated by solid lines) and the aberration that occurs when information is reproduced from a CD with the related objective lens for DVD which has no annular grooves (as indicated by dashed lines).

As is clear from FIGS. 5A and 5B, obvious changes occur in the aberration profiles of the objective lens of the first embodiment, particularly in the areas that correspond to the annular grooves formed on that objective lens.

Stated more specifically with reference to FIG. 5A that shows the aberrations that occur when information is reproduced from a DVD, the area corresponding to the first annular groove 1 is obviously within the limits of $\rho1$ and $\rho2$ and the aberration develops in a position offset about one wavelength. The area corresponding to the second annular groove 2 is obviously within the limits of $\rho2$ and $\rho3$ and the aberration develops in a position offset about two wavelengths. The area corresponding to the third annular groove 3 is obviously within the limits of $\rho3$ and $\rho4$ and the aberration develops in a position offset about one wavelength.

The reason for those offsets is that as already mentioned, the depths of the respective annular grooves are set at such values that the difference in optical pathlength between an area that does not have any annular groove and an area where an annular groove is formed is substantially equal to an integral multiple of the wavelength of the light used to reproduce information from a DVD.

With reference to FIG. 5B that shows the aberrations that occur when information is reproduced from a CD, the area corresponding to the first annular groove 1 is obviously within the limits of ρ1 and ρ2 and the aberration develops in a position offset about one wavelength. The area corresponding to the second annular groove 2 is obviously within the limits of ρ2 and ρ3 and the aberration develops in a position offset about two wavelengths. The area corresponding to the third annular groove 3 is obviously within the limits of ρ3 and ρ4 and the aberration develops in a position offset about one wavelength.

The reason for these offsets is because as already mentioned, the depths of the respective annular grooves are set at such values that the difference in optical pathlength between an area that does not have any annular groove and an area where an annular groove is formed is substantially equal to an integral multiple of the wavelength of the light used to reproduce information from a DVD. Stated more specifically, if information is reproduced with light of the wavelength for CD in the presence of annular grooves that are set at values substantially equal to integral multiples of the wavelength for DVD, the difference in wavelength contributes to a small decrease in aberrations, thus causing aberrations to develop in areas corresponding to values substantially near integral multiples of the wavelength for CD.

Thus, in the first embodiment of the present invention, the number of annular grooves, as well as their positions and depths are so set that the aberrations developing in areas that correspond to the annular grooves assume values that are substantially equal to integral multiples of the wavelength for DVD.

Figure 6A:
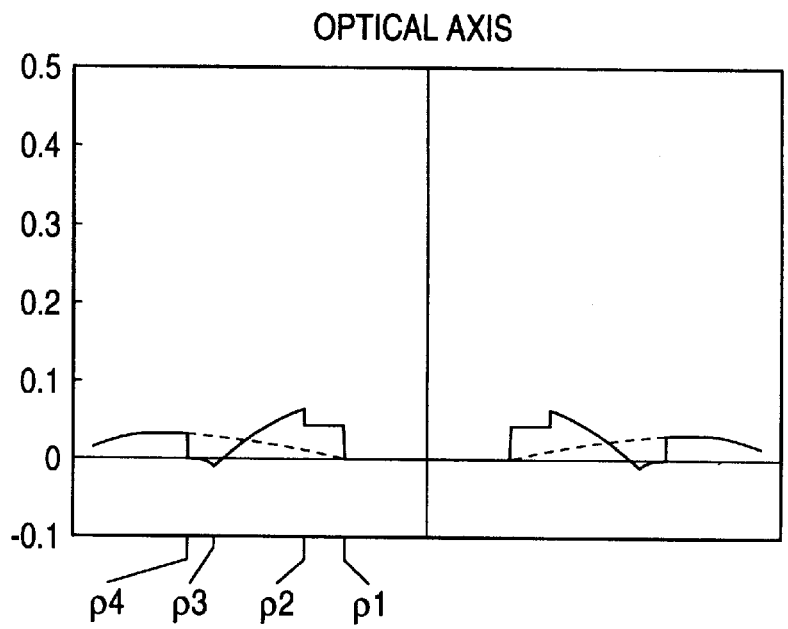
FIGS. 6A and 6B show the aberration characteristics of the objective lens of the first embodiment minus phase jump.
Figure 6B:
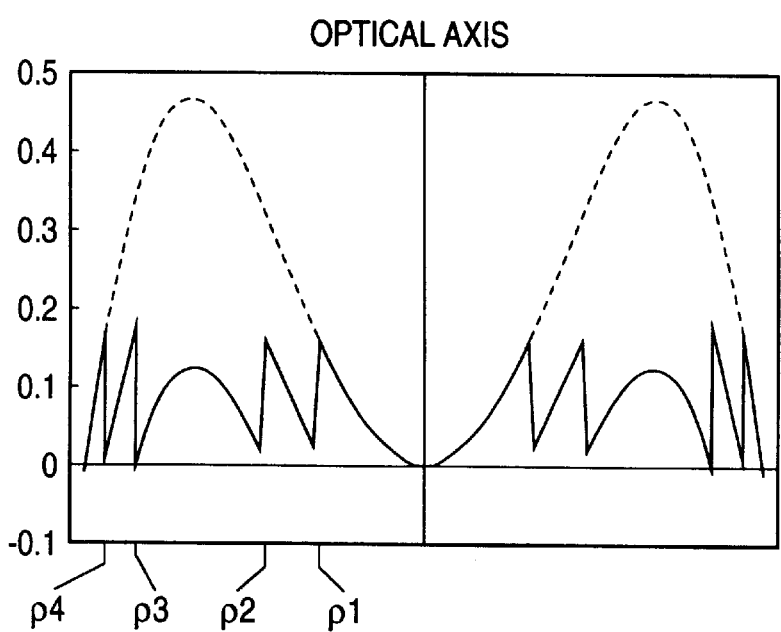

FIGS. 6A and 6B show the aberrations that occur from the application of the objective lens of the first embodiment minus the phase jump (integral multiple phase shift of the aberration) (as indicated by solid lines) and the aberrations that occur from the related objective lens for DVD (as indicated by dashed lines). Again, the vertical and horizontal axes of the graphs in FIGS. 6A and 6B represent the same as with FIG. 35 which was explained in connection with the related art.

FIG. 6A shows both the aberration that occurs when information is reproduced from a DVD with the objective lens of the first embodiment minus the phase jump (as indicated by solid lines) and the aberration that occurs when information is reproduced from a DVD with the related objective lens for DVD which has no annular grooves (as indicated by dashed lines). FIG. 6B shows both the aberration that occurs when information is reproduced from a CD with the objective lens of the first embodiment minus the phase jump (as indicated by solid lines) and the aberration that occurs when information is reproduced from a CD with the related objective lens for DVD which has no annular grooves (as indicated by dashed lines).

In short, FIGS. 6A and 6B show how much the aberrations shown in FIGS. SA and 5B deviate from integral multiples of the wavelength for DVD.

As is clear from FIG. 6A, the aberration that occurs when information is reproduced from a DVD with the objective lens of the first embodiment minus the phase jump (as indicated by solid lines) is somewhat greater than the aberration from the related objective lens (indicated by dashed lines) but it is not great enough to affect the characteristics of information reproduction. On the other hand, as is clear from FIG. 6B, the aberration that occurs when information is reproduced from a CD with the objective lens of the first embodiment minus the phase jump (as indicated by solid lines) is considerably smaller than the aberration from the related objective lens (indicated by dashed lines).

Thus, it is clear that the annular grooves contribute to improve the aberration characteristics for CD while hardly affecting the aberration characteristics for DVD.

Figure 7A:
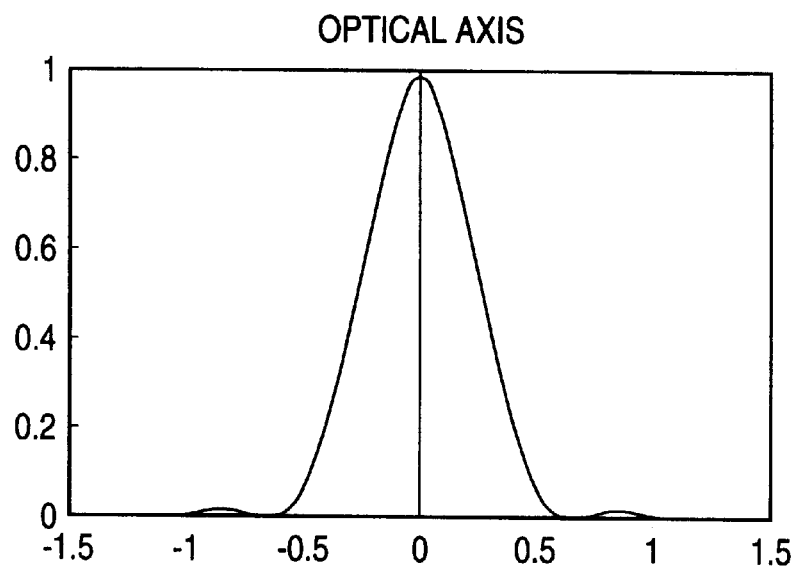
FIGS. 7A and 7B show the shapes of the spots formed with the objective lens of the first embodiment.
Figure 7B:
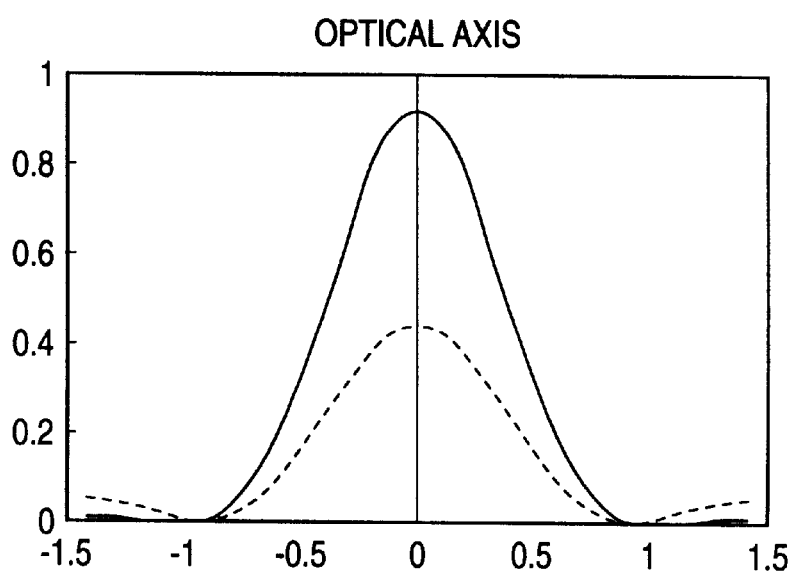

FIGS. 7A and 7B show the shapes of the spots formed on a disc when the objective lens of the first embodiment is applied (as indicated by solid lines) and the shapes of the spots formed on a disc when the related objective lens for DVD is applied (as indicated by dashed lines). The vertical axis of each graph represents the intensity of light, with the intensity at the center of the spot in the absence of aberrations being equal to one. The horizontal axis of each graph represents the distance from the spot center.

FIG. 7A shows the shape of the spot formed on a disc when information is reproduced from a DVD with the objective lens of the first embodiment (as indicated by a solid line) and the shape of the spot formed on a disc when information is reproduced from a DVD with the related objective lens for DVD which has no annular grooves (as indicated by a dashed line). FIG. 7B shows the shape of the spot formed on a disc when information is reproduced from a CD with the objective lens of the first embodiment (as indicated by a solid line) and the shape of the spot formed on a disc when information is reproduced from a CD with the related objective lens for DVD which has no annular grooves (as indicated by a dashed line).

As is clear from FIG. 7A, when information was reproduced from a DVD with the objective lens of the first embodiment, the resulting spot shape and Strehl ratio were substantially the same as those in the related case, with little change observed. It is therefore clear that the performance of the objective lens was little affected by the formation of the annular grooves.

On the other hand, as is clear from FIG. 7B, when information was reproduced from a CD with the objective lens of the first embodiment, the resulting Strehl ratio increased markedly from the related value, with the minimal occurrence of side lobes. Thus, the annular grooves formed on the objective lens helped improve the quality of beam spots.

Note that the aberrations that occur in a pickup must typically be reduced to less than Marshall's limit in terms of RMS and this means that values of at least 0.8 must be maintained in terms of the Strehl ratio. In the embodiment under consideration, information could be reproduced from a CD with the Strehl ratio exceeding 0.8 in the region of NA=0.45.

Thus, by forming annular grooves on the objective lens as shown in FIGS. 3A and 3B, the characteristics of information reproduction from CD could be substantially improved while hardly affecting the characteristics of information reproduction from DVD.

In the first embodiment, three annular grooves 1, 2 and 3 are formed on the objective lens 35 and the method of forming them is in no way limited.

In the first embodiment, the annular grooves are formed as shown in FIG. 3 but their number, positions and depths are by no means limited to the illustrated case. All that is needed is that the number of the annular grooves, their positions and depths should be appropriately set considering the aberration characteristics for DVD that are shown in FIG. 6A. As for the depths of the annular grooves, it is preferred to select values near h that is defined by Eq. 3.

Mainly for the purpose of protecting the annular grooves, their surface may be provided with a cover or recessed in a coating. In such cases, an appropriate value of h may be determined by adjusting Eq. 2 considering the refractive index of the protective material.

Figure 8:
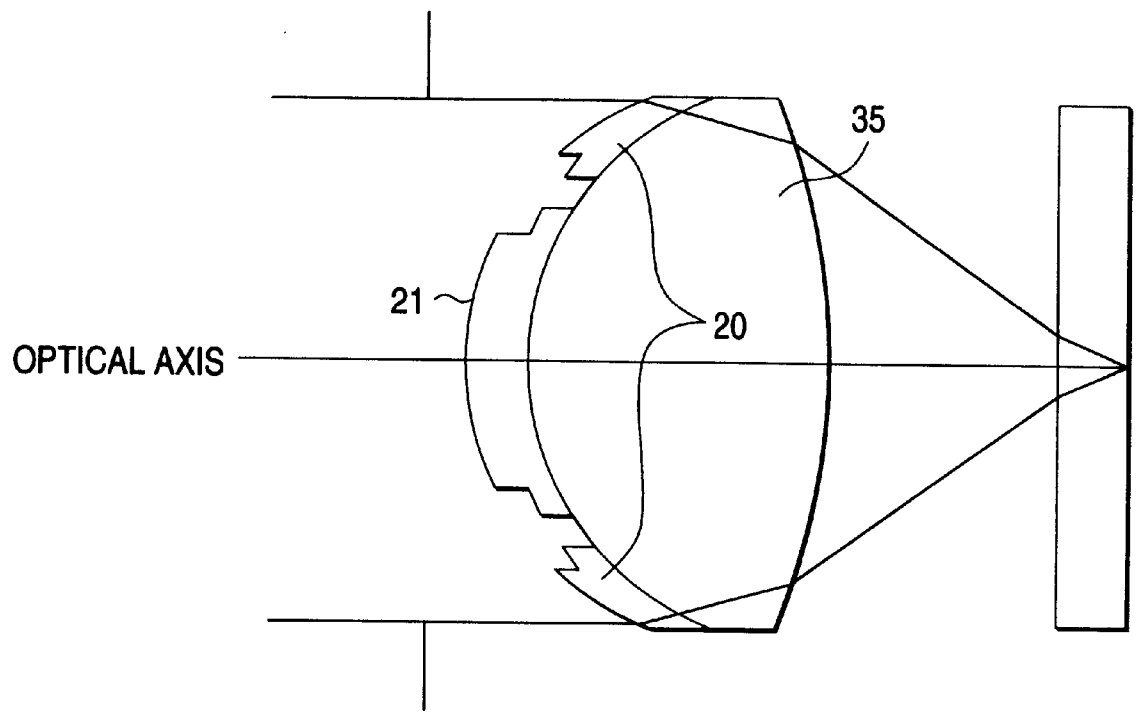
FIG. 8 shows a modification of the objective lens of the first embodiment.

FIG. 8 shows a modification of the first embodiment, in which annular ridges 20 and 21 are attached to the objective lens 35 to produce the same lens geometry as shown in FIGS. 3A and 3B. All that is needed is to create the lens geometry that is shown in FIG. 3. The annular ridges 20 and 21 to be attached are preferably made of the same material as the objective lens 35.

(Second Embodiment)

Figure 9A:
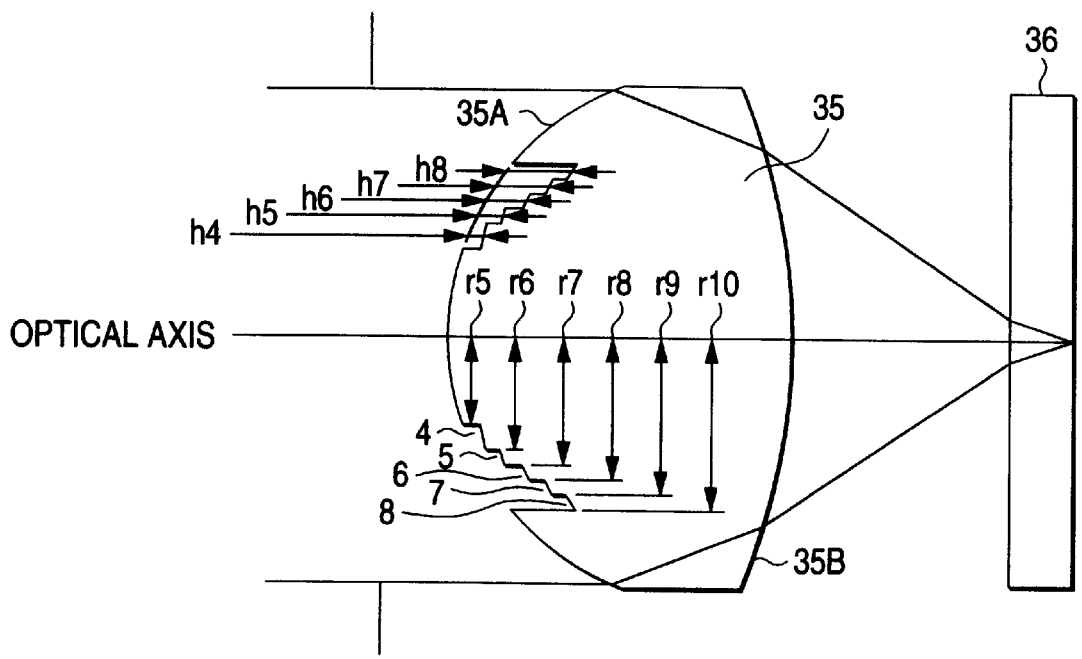
FIGS. 9A and 9B show the objective lens according to a second embodiment of the invention.
Figure 9B:
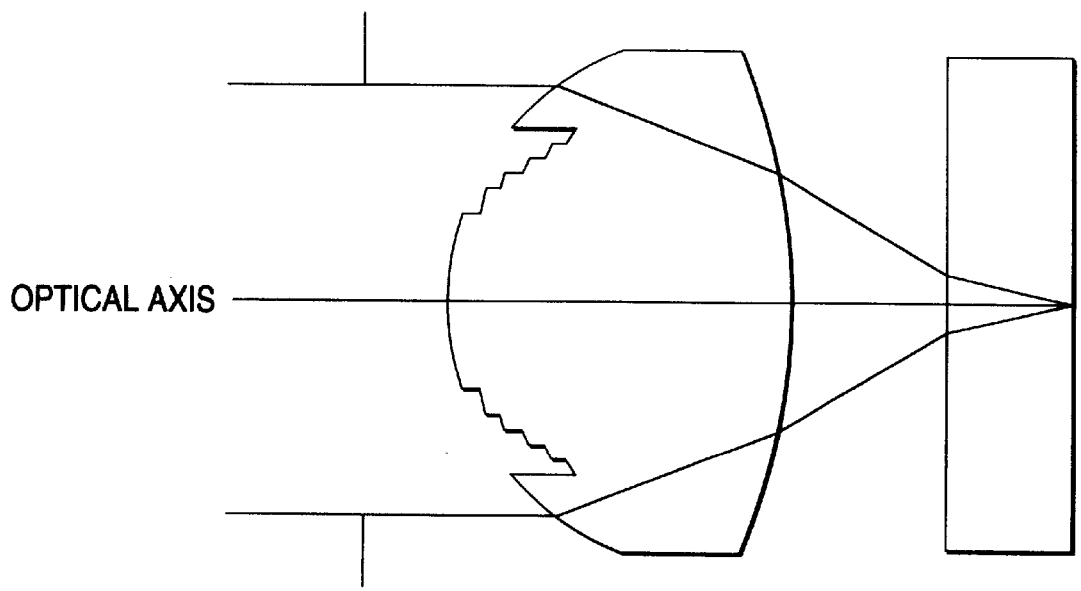

FIG. 9 shows the objective lens according to a second embodiment of the present invention. FIG. 9A shows the optical path of a wavelength of 650 nm to reproduce information from a DVD. FIG. 9B shows the optical path of a wavelength of 780 nm to reproduce information from a CD. Note that the optical path shown in FIG. 9B is under the same conditions as in the first embodiment.

In the second embodiment, the objective lens 35 basically set for a DVD is applied to reproduce information from a CD with such a design modification that the position of the objective lens as calculated from the CD's recording surface is set to be 7 μm greater than the position where minimal RMS aberrations occur in the region of NA=0.45. In addition, the surface geometry of the objective lens is improved so as to further decrease the RMS aberrations.

The construction and basic characteristics of the objective lens of the second embodiment are essentially the same as those of the objective lens of the first embodiment and need not be described here in detail. The only differences are about the number of annular grooves and their positions and depths, as described below in detail.

In the objective lens 35 shown in FIGS. 9A and 9B, the radii and depths of annular grooves 4 to 8 are set at the values shown in the following Table 4.

TABLE 4

Data on the annular grooves in the second embodiment

|  | Radius of inner circumference, mm | Radius of outer circumference, mm | Depth of groove, μm |
| --- | --- | --- | --- |
| First ring 4 | 0.292 (r5) | 0.488 (r6) | 1.35 (h4) |
| Second ring 5 | 0.488 (r6) | 0.622 (r7) | 2.70 (h5) |
| Third ring 6 | 0.622 (r7) | 0.769 (r8) | 4.05 (h6) |
| Fourth ring 7 | 0.769 (r8) | 0.940 (r9) | 5.40 (h7) |
| Fifth ring 8 | 0.940 (r9) | 1.136 (r10) | 6.75 (h8) |

As in the first embodiment, the depths h of the five annular grooves are set at such values that the difference in optical pathlength between an area that does not have any annular groove and an area where an annular groove is formed is substantially equal to an integral multiple of the wavelength for information reproduction from a DVD.

Figure 10A:
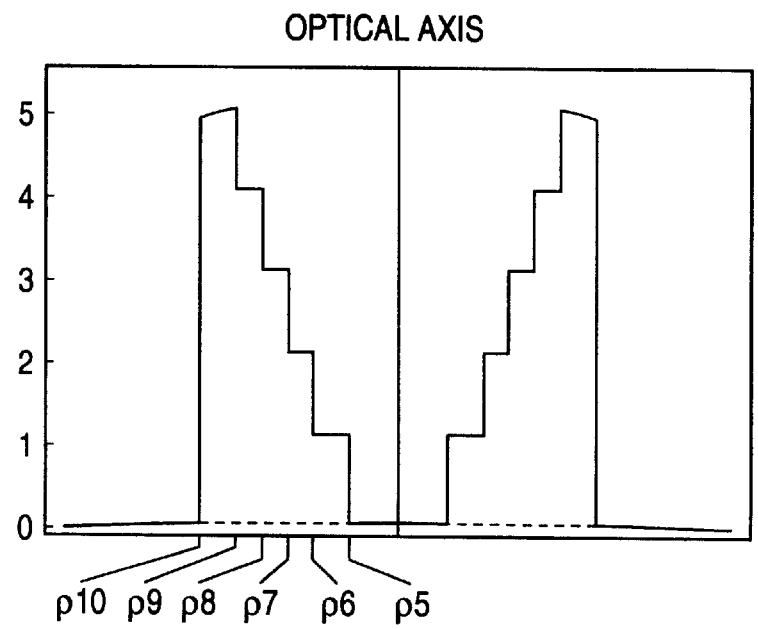
FIGS. 10A and 10B show the aberration characteristics of the objective lens of the second embodiment.
Figure 10B:
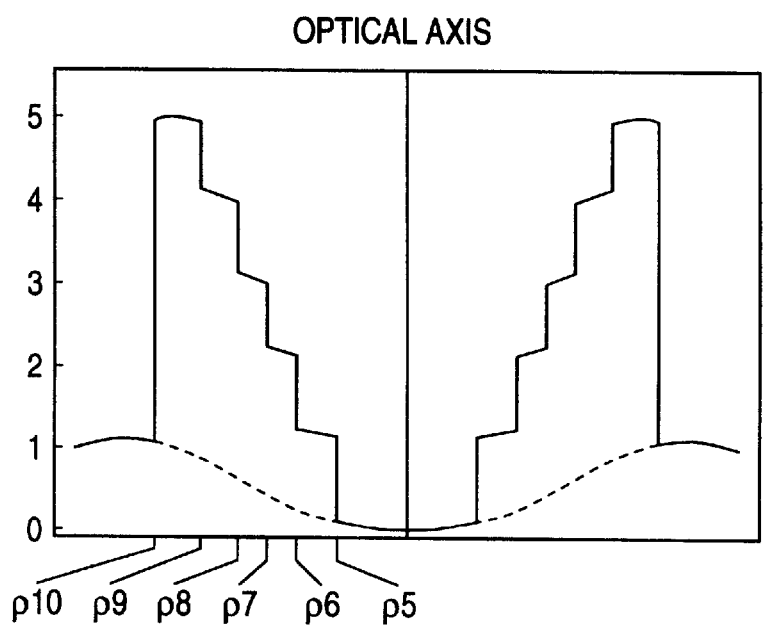

FIGS. 10A and 10B show the aberrations that occur when the objective lens of the second embodiment is applied (as indicated by solid lines) and the aberrations that occur from the related objective lens for DVD (as indicated by dashed lines). The vertical and horizontal axes of the graphs in FIGS. 10A and 10B represent the same as in the first embodiment.

FIG. 10A shows both the aberration that occurs when information is reproduced from a DVD with the objective lens of the second embodiment (as indicated by solid lines) and the aberration that occurs when information is reproduced from a DVD with the related objective lens for DVD which has no annular grooves (as indicated by dashed lines). FIG. 10B shows both the aberration that occurs when information is reproduced from a CD with the objective lens of the second embodiment (as indicated by solid lines) and the aberration that occurs when information is reproduced from a CD with the related objective lens for DVD which has no annular grooves (as indicated by dashed lines).

As is clear from FIGS. 10A and 10B, obvious changes occur in the aberration profiles of the objective lens of the second embodiment, particularly in the areas that correspond to the annular grooves formed on that objective lens.

Stated more specifically with reference to FIG. 10A that shows the aberrations that occur when information is reproduced from a DVD, the area corresponding to the first annular groove 4 is obviously within the limits of ρ5 and ρ6 and the aberration develops in a position offset about one wavelength. The area corresponding to the second annular groove 5 is obviously within the limits of ρ6 and ρ7 and the aberration develops in a position offset about two wavelengths. The area corresponding to the third annular groove 6 is obviously within the limits of ρ7 and ρ8 and the aberration develops in a position offset about three wavelengths. The area corresponding to the fourth annular groove 7 is obviously within the limits of ρ8 and ρ9 and the aberration develops in a position offset about four wavelengths. The area corresponding to the fifth annular groove 8 is obviously within the limits of ρ9 and ρ10 and the aberration develops in a position offset about five wavelengths.

The reason for these offsets is that as already mentioned, the depths of the respective annular grooves are set at such values that the difference in optical pathlength between an area that does not have any annular groove and an area where an annular groove is formed is substantially equal to an integral multiple of the wavelength for information reproduction from a DVD.

With reference to FIG. 10B that shows the aberrations that occur when information is reproduced from a CD, the area corresponding to the first annular groove 4 is obviously within the limits of ρ5 and ρ6 and the aberration develops in a position offset about one wavelength. The area corresponding to the second annular groove 5 is obviously within the limits of ρ6 and ρ7 and the aberration develops in a position offset about two wavelengths. The area corresponding to the third annular groove 6 is obviously within the limits of ρ7 and ρ8 and the aberration develops in a position offset about three wavelengths. The area corresponding to the fourth annular groove 7 is obviously within the limits of ρ8 and ρ9 and the aberration develops in a position offset about four wavelengths. The area corresponding to the fifth annular groove 8 is obviously within the limits of ρ9 and ρ10 and the aberration develops in a position offset about five wavelengths.

The reason for these offsets is that as already mentioned, the depths of the respective annular grooves are set at such values that the difference in optical pathlength between an area having no annular grooves and an area where an annular groove is formed is substantially equal to an integral multiple of the wavelength of the light used to reproduce information from a DVD. Stated more specifically, if information is reproduced with light of the wavelength for CD in the presence of annular grooves that are set at values substantially equal to integral multiples of the wavelength for DVD, the difference in wavelength contributes to a small decrease in aberrations, thus causing aberrations to develop in areas corresponding to values substantially near integral multiples of the wavelength for CD.

Thus, in the second embodiment of the present invention, the number of annular grooves, as well as their positions and depths are so set that the aberrations developing in areas that correspond to the annular grooves assume values that are substantially equal to integral multiples of the wavelength for DVD.

Figure 11A:
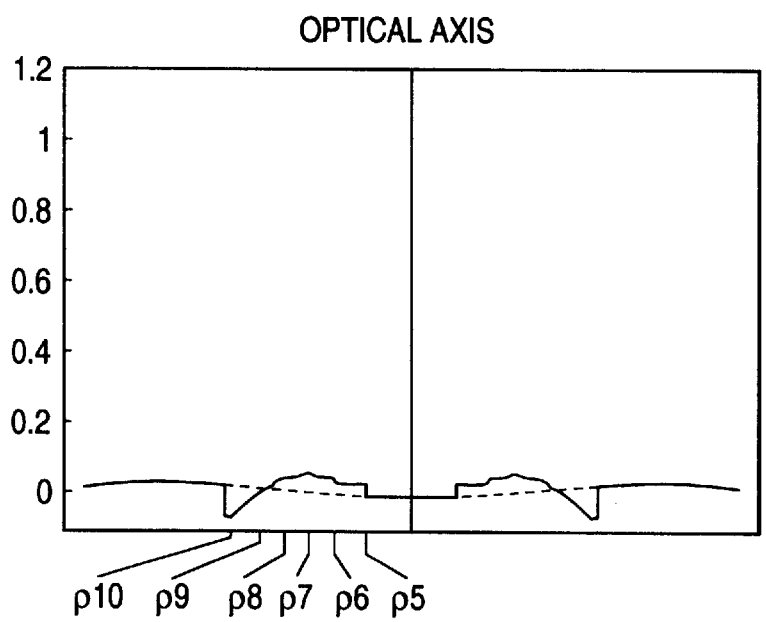
FIGS. 11A and 11B show the aberration characteristics of the objective lens of the second embodiment minus phase jump.
Figure 11B:
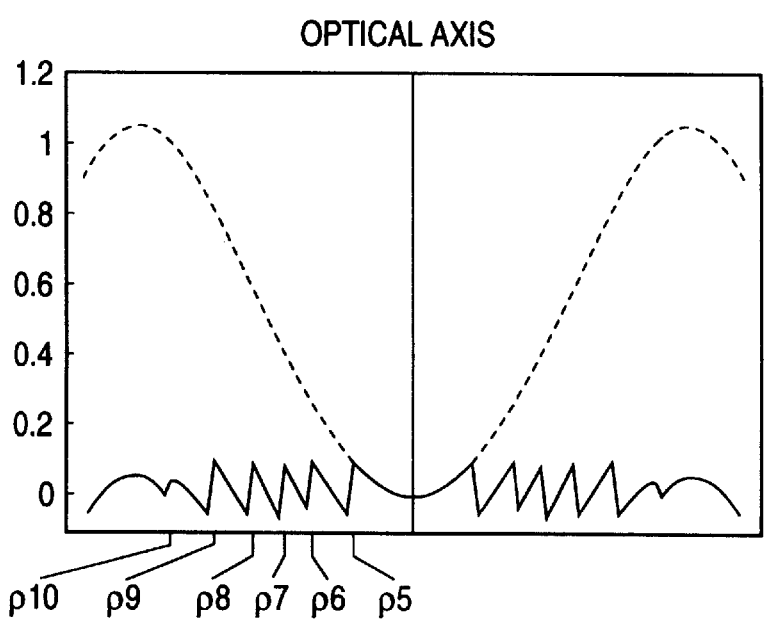

FIGS. 11A and 11B show the aberrations that occur from the application of the objective lens of the second embodiment minus the phase jump (as indicated by solid lines) and the aberrations that occur from the related objective lens for DVD (as indicated by dashed lines). Again, the vertical and horizontal axes of the graphs in FIGS. 11A and 11B represent the same as in the first embodiment.

FIG. 11A shows both the aberration that occurs when information is reproduced from a DVD with the objective lens of the second embodiment minus the phase jump (as indicated by solid lines) and the aberration that occurs when information is reproduced from a DVD with the related objective lens for DVD which has no annular grooves (as indicated by dashed lines). FIG. 11B shows both the aberration that occurs when information is reproduced from a CD with the objective lens of the second embodiment minus the phase jump (as indicated by solid lines) and the aberration that occurs when information is reproduced from a CD with the related objective lens for DVD which has no annular grooves (as indicated by dashed lines).

In short, FIGS. 11A and 11B show how much the aberrations shown in FIGS. 10A and 10B deviate from integral multiples of the wavelength for DVD.

As is clear from FIG. 11A, the aberration that occurs when information is reproduced from a DVD with the objective lens of the second embodiment minus the phase jump (as indicated by solid lines) is somewhat greater than the aberration from the related objective lens (indicated by dashed lines) but it is not great enough to affect the characteristics of information reproduction. On the other hand, as is clear from FIG. 11B, the aberration that occurs when information is reproduced from a CD with the objective lens of the second embodiment minus the phase jump (as indicated by solid lines) is considerably smaller than the aberration from the related objective lens (indicated by dashed lines).

Thus, it is clear that the annular grooves contribute to improve the aberration characteristics for CD while hardly affecting the aberration characteristics for DVD.

Figure 12A:
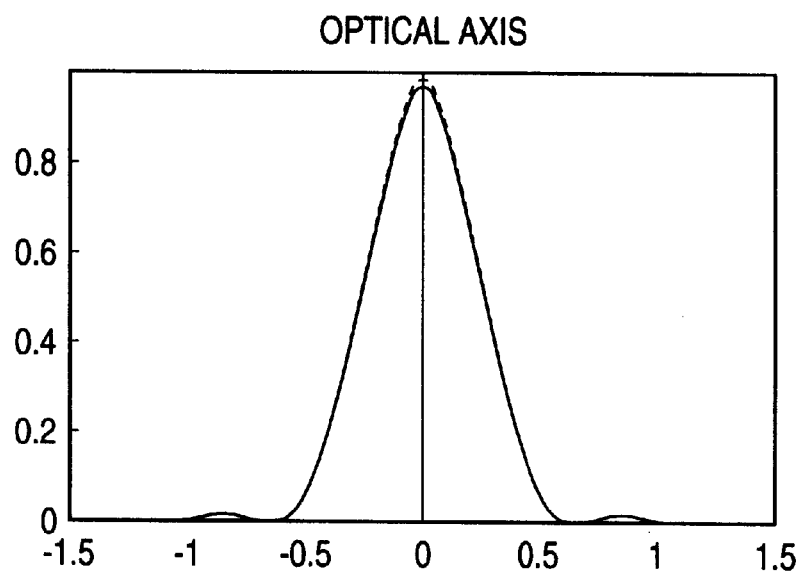
FIGS. 12A and 12B show the shapes of the spots formed with the objective lens of the second embodiment.
Figure 12B:
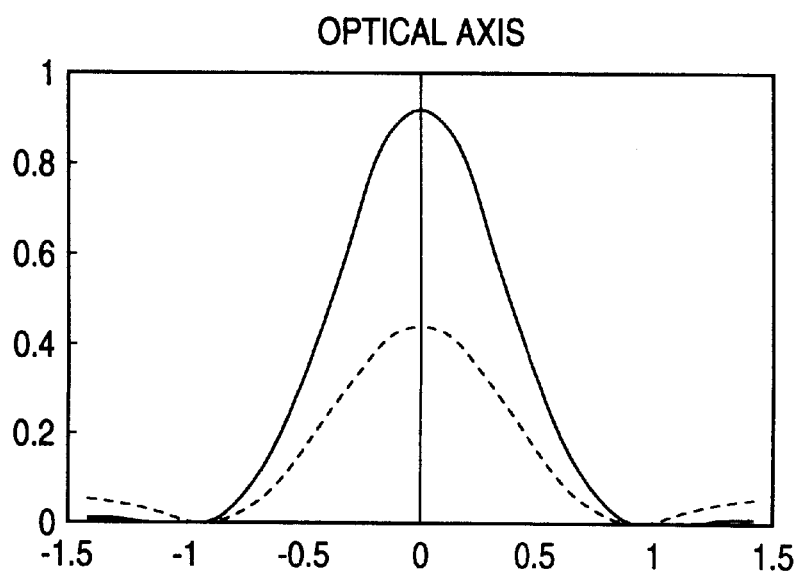

FIGS. 12A and 12B show the shapes of the spots formed on a disc when the objective lens of the second embodiment is applied (as indicated by solid lines) and the shapes of the spots formed on a disc when the related objective lens for DVD is applied (as indicated by dashed lines) Again, the vertical and horizontal axes of each graph represent the same as in the first embodiment.

FIG. 12A shows the shape of the spot formed on a disc when information is reproduced from a DVD with the objective lens of the second embodiment (as indicated by a solid line) and the shape of the spot formed on a disc when information is reproduced from a DVD with the related objective lens for DVD having no annular grooves (as indicated by a dashed line). FIG. 12B shows the shape of the spot formed on a disc when information is reproduced from a CD with the objective lens of the second embodiment (as indicated by a solid line) and the shape of the spot formed on a disc when information is reproduced from a CD with the related objective lens for DVD having no annular grooves (as indicated by a dashed line).

As is clear from FIG. 12A, when information was reproduced from a DVD with the objective lens of the second embodiment, the resulting spot shape and Strehl ratio were substantially the same as those in the related case, with little change observed. It is therefore clear that the performance of the objective lens was little affected by the formation of the annular grooves.

On the other hand, as is clear from FIG. 12B, when information was reproduced from a CD with the objective lens of the second embodiment, the resulting Strehl ratio increased markedly from the related value so that the Strehl ratio is at least 0.8 in the region of NA=0.45, and the occurrence of side lobes was restrained. Thus, the annular grooves formed on the objective lens helps improve the quality of beam spots.

Thus, by forming annular grooves on the objective lens as shown in FIGS. 9A and 9B, the characteristics of information reproduction from CD could be substantially improved while hardly affecting the characteristics of information reproduction from DVD.

In the second embodiment, although the annular grooves are formed as shown in FIGS. 9A and 9B, as in the first embodiment, their number, positions and depths are by no means limited to the illustrated case. The number of the annular grooves, their positions and depths suffice to be appropriately set considering the aberration characteristics for DVD that are shown in FIG. 11A. As for the depths of the annular grooves, it is preferred to select values near h that is defined by Eq. 3.

Mainly for the purpose of protecting the annular grooves, their surface may be provided with a cover or embed a recess in a coating. In such cases, an appropriate value of h may be determined by adjusting Eq. 2 considering the refractive index of the protective material.

Figure 13:
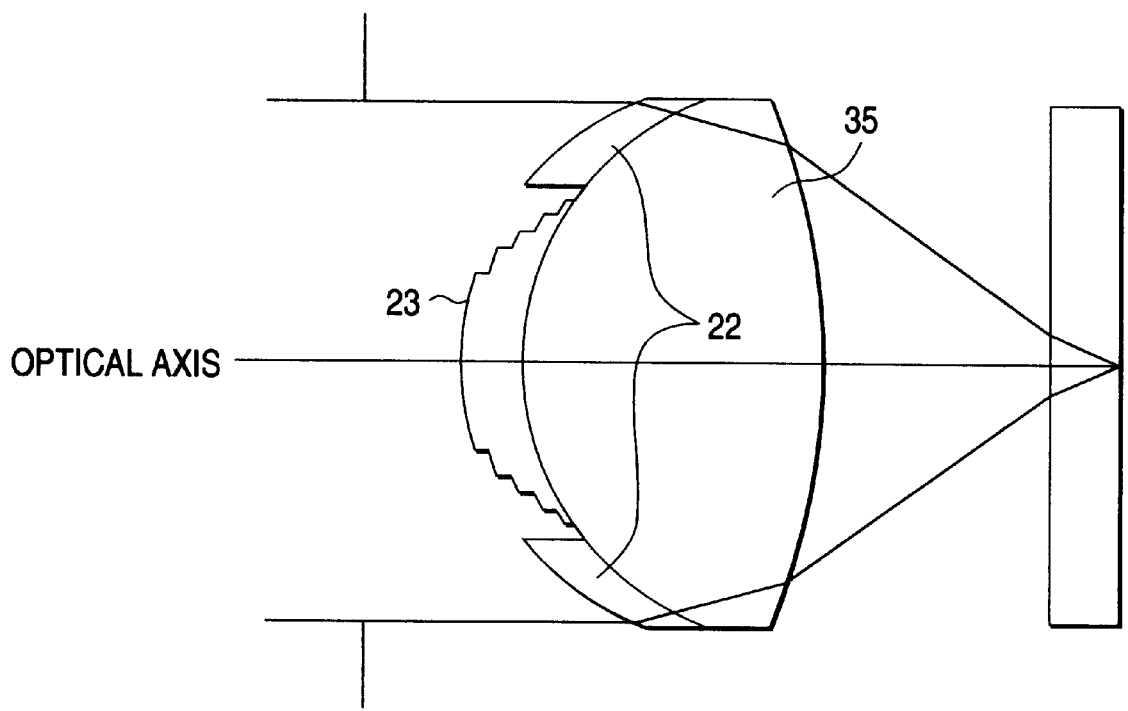
FIG. 13 shows a modification of the objective lens of the second embodiment.

FIG. 13 shows a modification of the second embodiment, in which annular ridges 22 and 23 are attached to the objective lens 35 to produce the same lens geometry as shown in FIGS. 9A and 9B. All that is needed is to create the lens geometry that is shown in FIGS. 9A and 9B. The annular ridges 22 and 23 to be attached are preferably made of the same material as the objective lens 35.

(Third Embodiment)

Figure 14A:
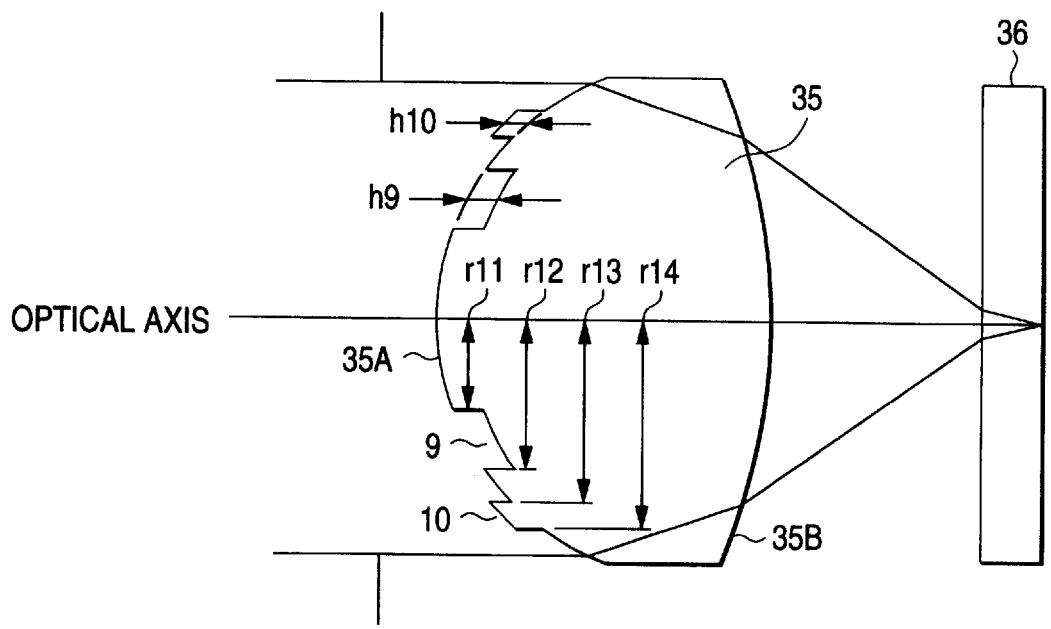
FIG. 14A and 14B show the objective lens according to a third embodiment of the invention.
Figure 14B:
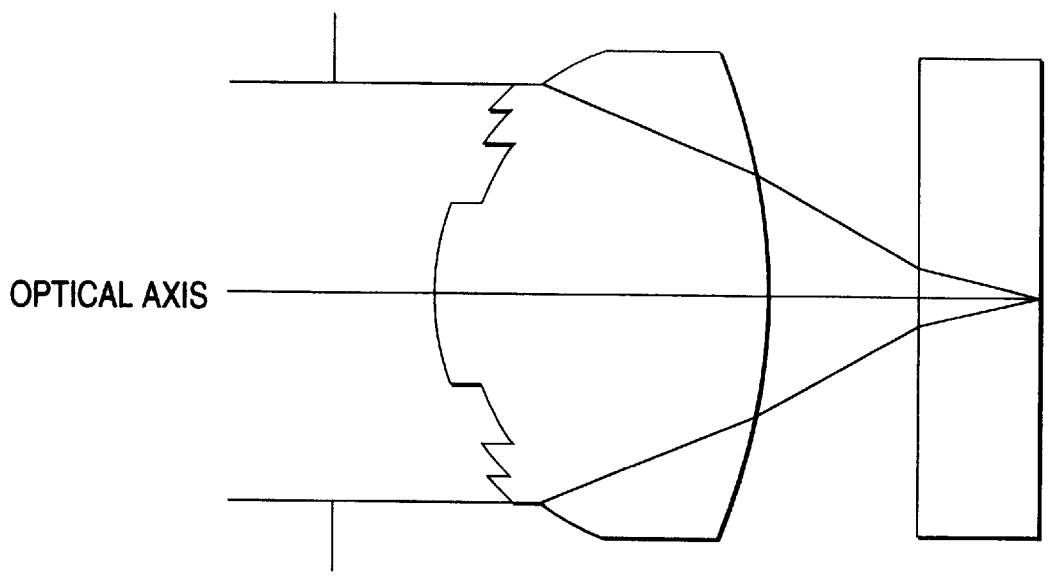

FIGS. 14A and 14B show the objective lens according to a third embodiment of the present invention. FIG. 14A shows the optical path of a wavelength of 650 nm to reproduce information from a DVD. FIG. 14B shows the optical path of a wavelength of 780 nm to reproduce information from a CD. Note that the optical path shown in FIG. 14B is under the same conditions as in the first embodiment.

In the third embodiment, the objective lens 35 basically set for DVD is applied to reproduce information from a CD with the following design. Firstly, the position of the objective lens as calculated from the CD's recording surface is set to be 1.5 $\mu$m smaller than the position where minimal RMS aberrations occur in the region of NA=0.45. In this position, the surface geometry of the objective lens is improved so as to further decrease the RMS aberrations.

The construction and basic characteristics of the objective lens of the third embodiment are also essentially the same as those of the objective lens of the first embodiment and need not be described here in detail. The only differences are about the numbers of annular grooves and ridges, as well as their positions and depths or heights, as described below in detail.

In the objective lens 35 shown in FIGS. 14A and 14B, the radii of an annular groove 9 and an annular ridge 10, the depth of the annular groove 9, the height of the annular ridge 10 are set at the values shown in the following Table 5.

TABLE 5

Data on the annular groove and ridge in the third embodiment

| | Radius of inner circumference, mm | Radius of outer circumference, mm | Depth of groove, μm | Height of ridge, μm |
|---|---|---|---|---|
| First ring 9 | 0.620 (r11) | 1.274 (r12) | 1.35 (h9) | — |
| Second ring 10 | 1.392 (r13) | 1.500 (r14) | — | 1.37 (h10) |

As in the first embodiment, the depth h of the annular groove 9 and the height h of the annular ridge 10 are set at such values that the difference in optical pathlength between an area that does not have any annular groove or ridge and an area where an annular groove or ridge is formed is substantially equal to an integral multiple of the wavelength for information reproduction from a DVD.

Figure 15A:
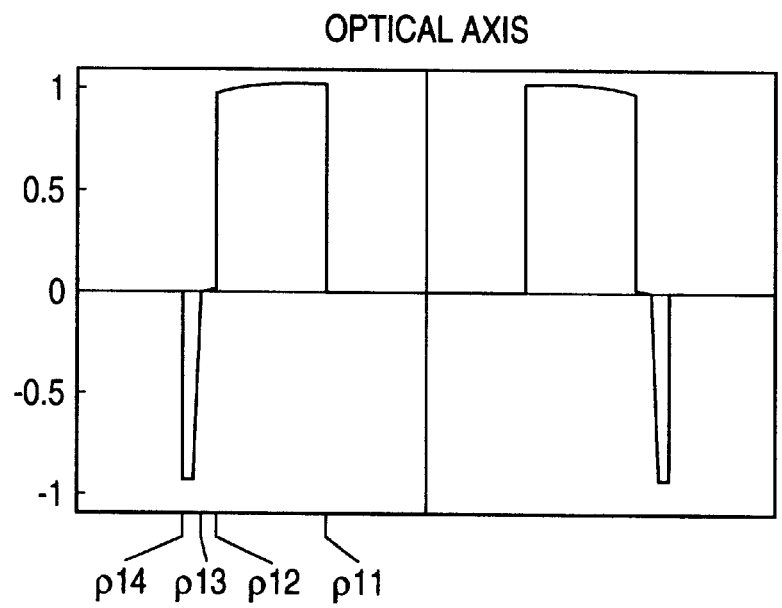
FIG. 15A and 15B show the aberration characteristics of the objective lens of the third embodiment.
Figure 15B:
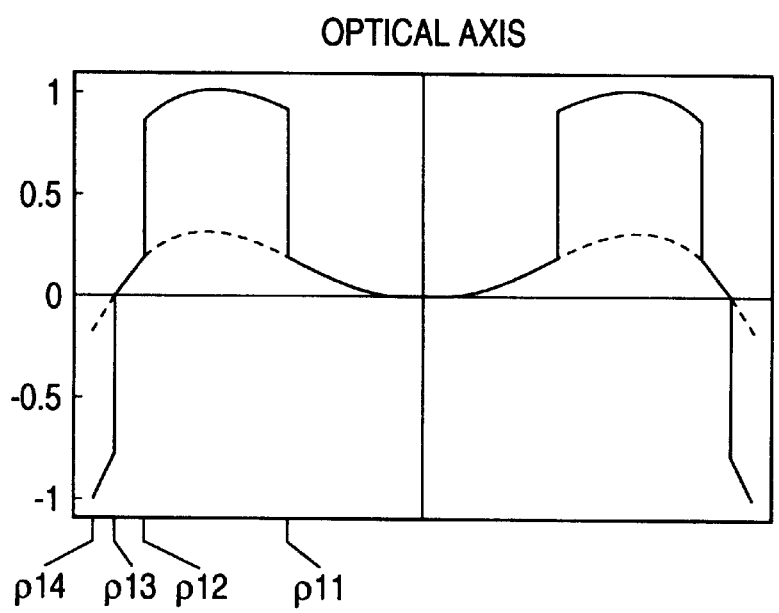

FIGS. 15A and 15B show the aberrations that occur when the objective lens of the third embodiment is applied (as indicated by solid lines) and the aberrations that occur from the related objective lens for DVD (as indicated by dashed lines). The vertical and horizontal axes of the graphs in FIGS. 15A and 15B represent the same as in the first embodiment.

FIG. 15A shows both the aberration that occurs when information reproduced from a DVD with the objective lens of the third embodiment (as indicated by solid lines) and the aberration that occurs when information is reproduced from a DVD with the related objective lens for DVD which has neither annular grooves nor ridges (as indicated by dashed lines). FIG. 15B shows both the aberration that occurs when information is reproduced from a CD with the objective lens of the third embodiment (as indicated by solid lines) and the aberration that occurs when information is reproduced from a CD with the related objective lens for DVD which has neither annular grooves nor ridges (as indicated by dashed lines).

As is clear from FIGS. 15A and 15B, obvious changes occur in the aberration profiles of the objective lens of the third embodiment, particularly in the areas that correspond to the annular groove and ridge, respectively, formed on that objective lens.

Stated more specifically with reference to FIG. 15A that shows the aberrations that occur when information is reproduced from a DVD, the area corresponding to the annular groove 9 is obviously within the limits of ρ11 and ρ12 and the aberration develops in a position offset about one wavelength. The area corresponding to the annular ridge 10 is obviously within the limits of ρ13 and ρ14 and the aberration develops in a position offset about one wavelength in the negative direction.

The reason for these offsets is that as already mentioned, the depth of the annular groove and the height of the annular ridge are set at such values that the difference in optical pathlength between an area that has neither annular grooves nor ridges and an area where an annular groove or ridge is formed is substantially equal to an integral multiple of the wavelength for information reproduction from a DVD.

With reference to FIG. 15B that shows the aberrations that occur when information is reproduced from a CD, the area corresponding to the annular groove 9 is obviously within the limits of ρ11 and ρ12 and the aberration develops in a position offset about one wavelength. The area corresponding to the annular ridge 10 is obviously within the limits of ρ13 and ρ14 and the aberration develops in a position offset about one wavelength in the negative direction.

The reason for these offsets is that as already mentioned, the depth of the annular groove and the height of the annular ridge are set at such values that the difference in optical pathlength between an area that has neither annular grooves nor ridges and an area where an annular groove or ridge is formed is substantially equal to an integral multiple of the wavelength for information reproduction from a DVD. Stated more specifically, if information is reproduced with light of the wavelength for CD in the presence of annular grooves or ridges that are set at values substantially equal to integral multiples of the wavelength for DVD, the difference in wavelength contributes to a small decrease in aberrations, thus causing aberrations to develop in areas corresponding to values substantially near integral multiples of the wavelength for CD.

Thus, in the third embodiment of the present invention, the numbers of annular grooves and ridges, as well as their positions and depths/heights are so set that the aberrations developing in areas that correspond to the annular grooves and ridges assume values that are substantially equal to integral multiples of the wavelength for DVD.

Figure 16A:
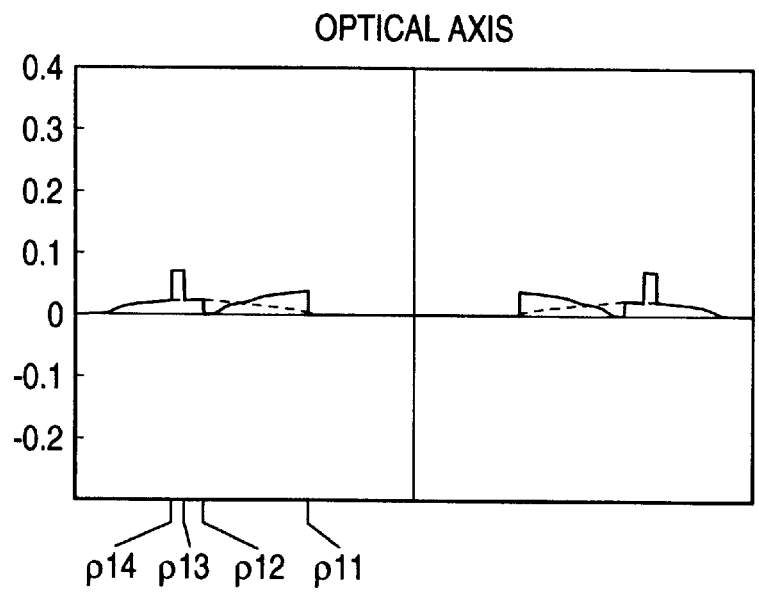
FIGS. 16A and 16B show the aberration characteristics of the objective lens of the third embodiment minus phase jump.
Figure 16B:
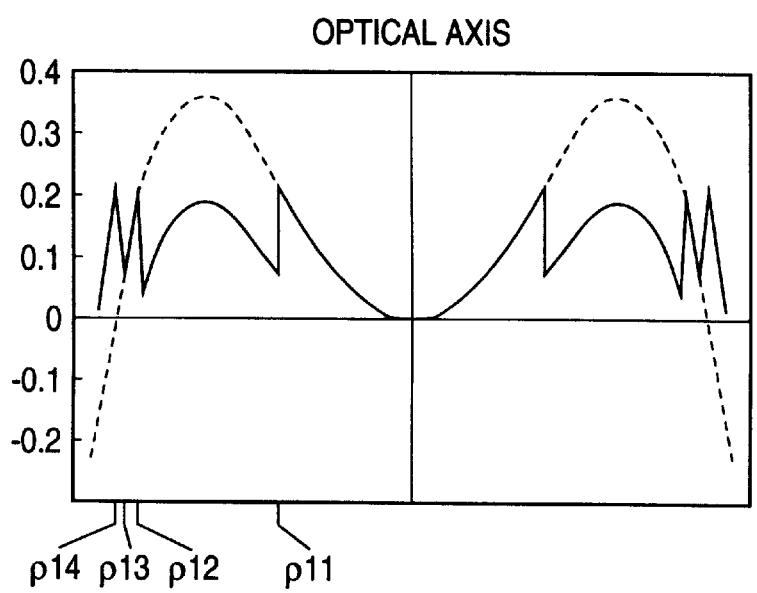

FIGS. 16A and 16B show the aberrations in the application of the objective lens of the third embodiment minus the phase jump (as indicated by solid lines) and the aberrations that occur from the related objective lens for DVD (as indicated by dashed lines). Again the vertical and horizontal axes of the graphs in FIGS. 16A and 16B represent the same as in the first embodiment.

FIG. 16A shows both the aberration that occurs when information is reproduced from a DVD with the objective lens of the third embodiment minus the phase jump (as indicated by solid lines) and the aberration that occurs when information is reproduced from a DVD with the related objective lens for DVD which has neither annular grooves nor ridges (as indicated by dashed lines). FIG. 16B shows both the aberration that occurs when information is reproduced from a CD with the objective lens of the third embodiment minus the phase jump (as indicated by solid lines) and the aberration that occurs when information is reproduced from a CD with the related objective lens for DVD which has neither annular grooves nor ridges (as indicated by dashed lines).

In short, FIGS. 16A and 16B show how much the aberrations shown in FIGS. 15A and 15B deviate from integral multiples of the wavelength for DVD.

As is clear from FIG. 16A, the aberration that occurs when information is reproduced from a DVD with the objective lens of the third embodiment minus the phase jump (as indicated by solid lines) is somewhat greater than the aberration from the related objective lens (indicated by dashed lines) but it is not great enough to affect the characteristics of information reproduction. On the other hand, as is clear from FIG. 16B, the aberration that occurs when information is reproduced from a CD with the objective lens of the third embodiment minus the phase jump (as indicated by solid lines) is considerably smaller than the aberration from the related objective lens (indicated by dashed lines).

Thus, it is clear that the annular groove and ridge contribute to improve the aberration characteristics for CD while hardly affecting the aberration characteristics for DVD.

Figure 17A:
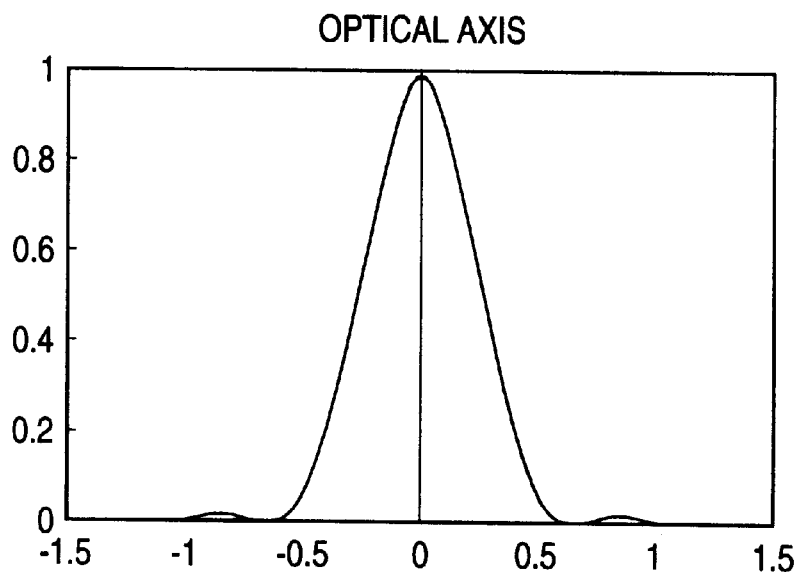
FIGS. 17A and 17B show the shapes of the spots formed with the objective lens of the third embodiment.
Figure 17B:
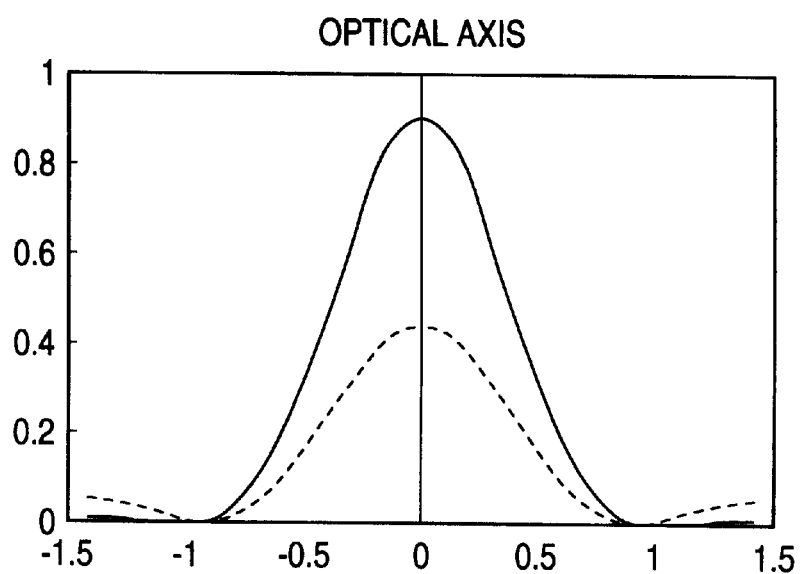

FIGS. 17A and 17B show the shapes of the spots formed on a disc when the objective lens of the third embodiment is applied (as indicated by solid lines) and the shapes of the spots formed on a disc when the related objective lens for DVD is applied (as indicated by dashed lines). Again, the vertical and horizontal axes of each graph represent the same as in the first embodiment.

FIG. 17A shows the shape of the spot formed on a disc when information is reproduced from a DVD with the objective lens of the third embodiment (as indicated by solid lines) and the shape of the spot formed on a disc when information is reproduced from a DVD with the related objective lens for DVD having neither annular grooves nor ridges (as indicated by dashed lines). FIG. 17B shows the shape of the spot formed on a disc when information is reproduced from a CD with the objective lens of the third embodiment (as indicated by solid lines) and the shape of the spot formed on a disc when information is reproduced from a CD with the related objective lens for DVD having neither annular grooves nor ridges (as indicated by dashed lines).

As is clear from FIG. 17A, when information was reproduced from a DVD with the objective lens of the third embodiment, the resulting spot shape and Strehl ratio were substantially the same as those in the related case, with little change observed. It is therefore clear that the performance of the objective lens was little affected by the formation of the annular groove and ridge.

On the other hand, as is clear from FIG. 17B, when information was reproduced from a CD with the objective lens of the third embodiment, the resulting Strehl ratio increased markedly from the related value, the Strehl ration was at least 0.8 in the region of NA=0.45, and the occurrence of side lobes was minimal. Thus, with the annular groove and ridge formed on the objective lens, the quality of beam spots is improved.

Thus, by forming an annular groove and an annular ridge on the objective lens as shown in FIGS. 14A and 14B, the characteristics of information reproduction from CD could be considerably improved while hardly affecting the characteristics of information reproduction from DVD.

In the third embodiment, the annular groove and ridge are formed as shown in FIGS. 14A and 14B but as in the first embodiment their number, positions, depth or height are by no means limited to the illustrated case. The number of the annular groove and ridge, their positions and depths or heights suffice to be appropriately set considering the aberration characteristics for DVD that are shown in FIG. 16A. As for the depths or heights of the annular grooves or ridges, it is preferred to select values near h that is defined by Eq. 3.

Mainly for the purpose of protecting the annular groove, its surface may be provided with a cover or embedded in a coating. In such cases, an appropriate value of h may be determined by adjusting Eq. 2 considering the refractive index of the protective material.

Figure 18:
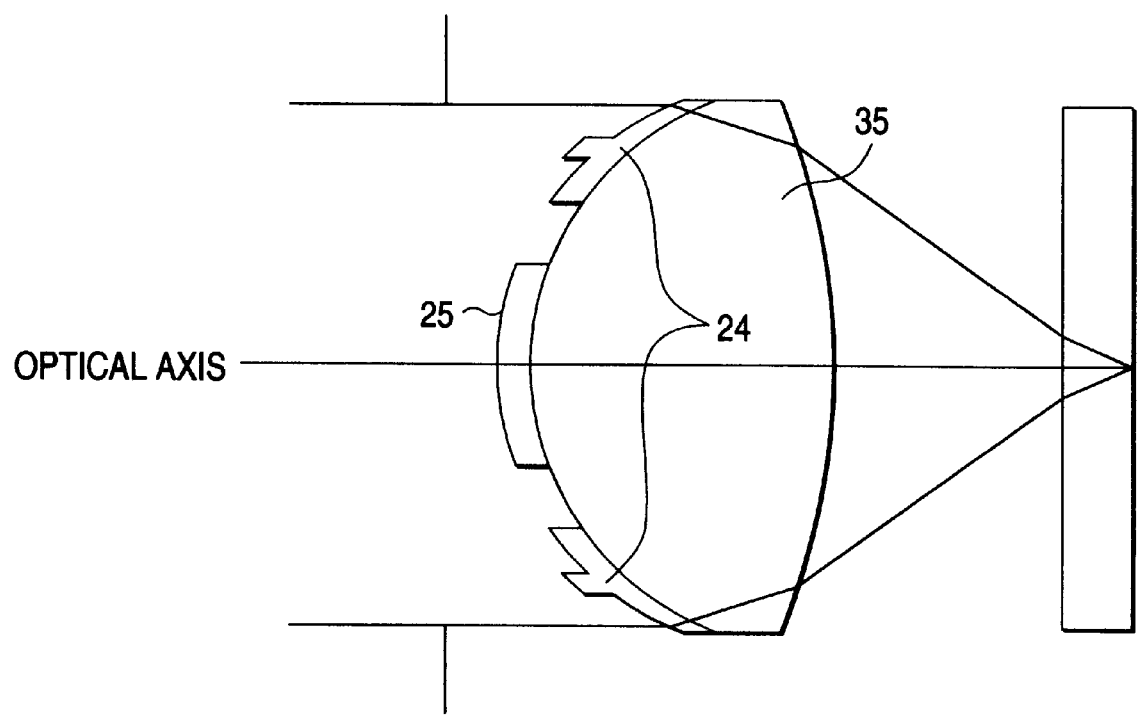
FIG. 18 shows a modification of the objective lens of the third embodiment.

FIG. 18 shows a modification of the third embodiment, in which annular ridges 24 and 25 are attached to the objective lens 35 to produce the same lens geometry as shown in FIGS. 14A and 14B. All that is needed is to create the lens geometry that is shown in FIG. 14A and 14B. The annular ridges 24 and 25 to be attached are preferably made of the same material as the objective lens 35.

(Fourth Embodiment)

Figure 19A:
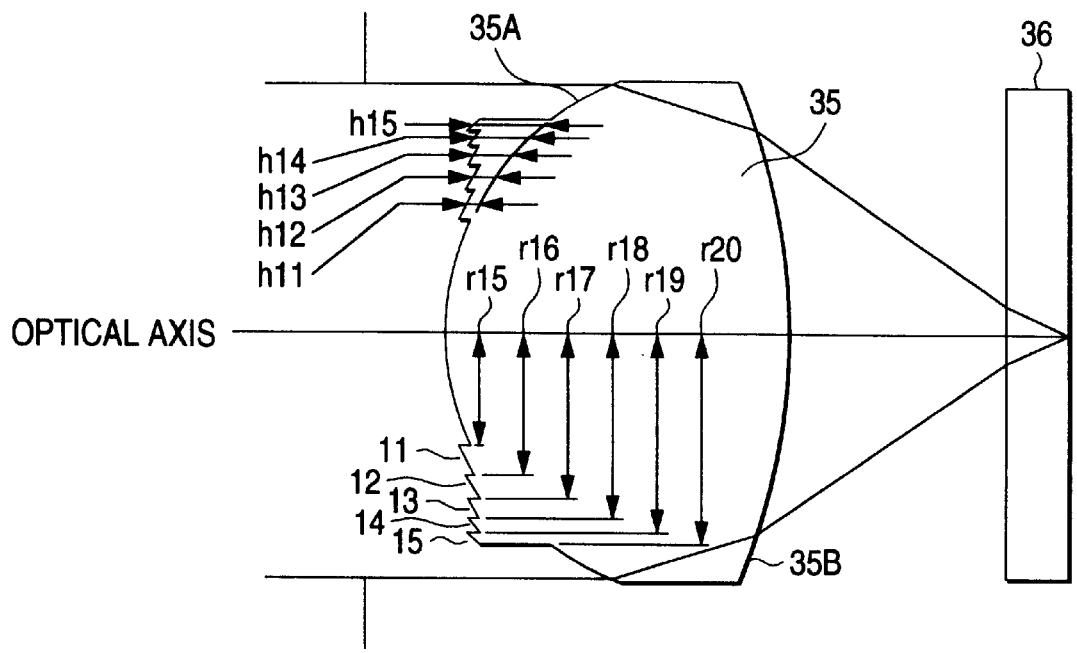
FIGS. 19A and 19B show the objective lens according to a fourth embodiment of the invention.
Figure 19B:
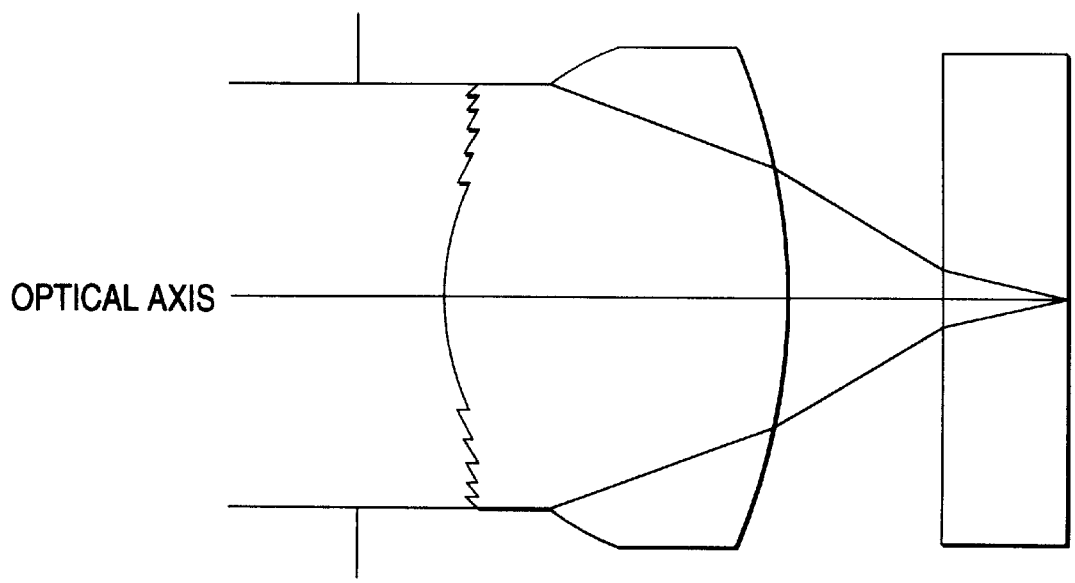

FIGS. 19A and 19B show the objective lens according to a fourth embodiment of the present invention. FIG. 19A shows the optical path of a wavelength of 650 nm to reproduce information from a DVD. FIG. 19B shows the optical path of a wavelength of 780 nm to reproduce information from a CD. Note that the optical path shown in FIG. 19B is under the same conditions as in the first embodiment.

In the fourth embodiment, the objective lens 35 basically set for DVD is applied to reproduce information from a CD with the following design. The position of the objective lens as calculated from the CD's recording surface is set to be 6 4m smaller than the position where minimal RMS aberrations occur in the region of NA=0.45. In the position, the surface geometry of the objective lens is improved so as to further decrease the RMS aberrations.

The construction and basic characteristics of the objective lens of the fourth embodiment are essentially the same as those of the objective lens of the first embodiment and need not be described here in detail. The only differences are about the number of annular ridges and their positions and heights, as described below in detail.

In the objective lens 35 shown in FIGS. 19A and 19B, the radii and depths of annular ridges 11 to 15 are set at the values shown in the following Table 6.

TABLE 6

Data on the annular ridges in the fourth embodiment

| | Radius of inner circumference, mm | Radius of outer circumference, mm | Height of ridge, μm |
|---|---|---|---|
| First ring 11 | 1.096 (r15) | 1.230 (r16) | 1.42 (h11) |
| Second ring 12 | 1.230 (r16) | 1.316 (r17) | 2.84 (h12) |
| Third ring 13 | 1.316 (r17) | 1.390 (r18) | 4.26 (h13) |
| Fourth ring 14 | 1.390 (r18) | 1.458 (r19) | 5.68 (h14) |
| Fifth ring 15 | 1.458 (r19) | 1.500 (r20) | 7.10 (h15) |

As in the first embodiment, the heights h of the five annular ridges are set at such values that the difference in optical pathlength between an area that does not have any annular ridge and an area where an annular ridge is formed is substantially equal to an integral multiple of the wavelength for information reproduction from a DVD.

Figure 20A:
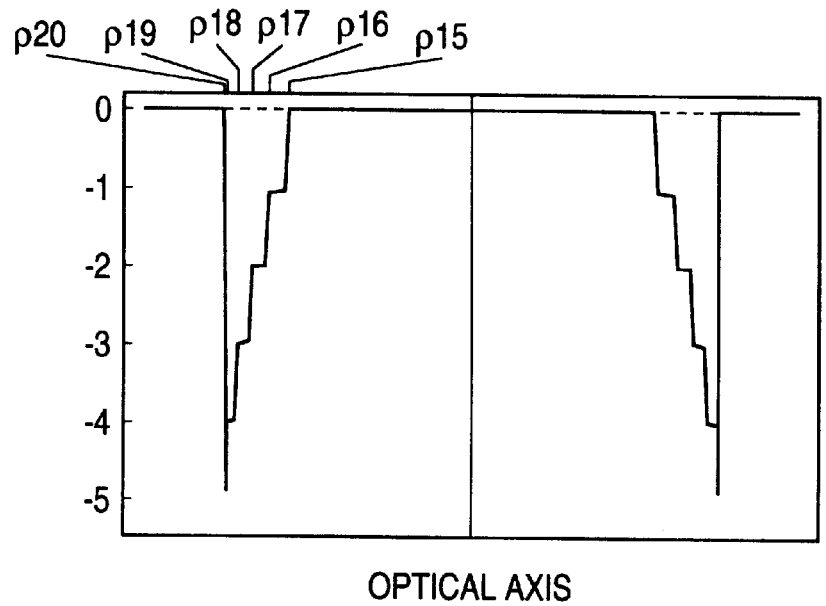
FIGS. 20A and 20B show the aberration characteristics of the objective lens of the fourth embodiment.
Figure 20B:
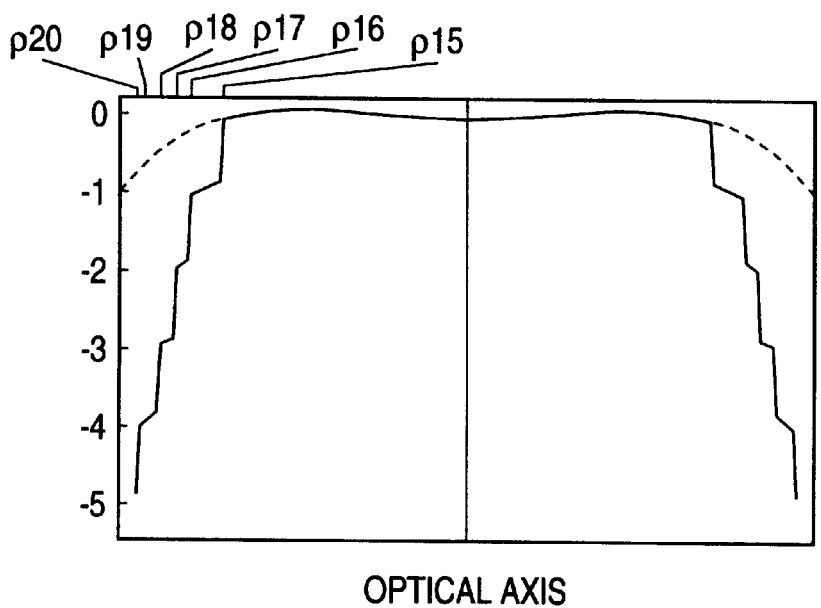

FIGS. 20A and 20B show the aberrations that occur when the objective lens of the fourth embodiment is applied (as indicated by solid lines) and the aberrations that occur from the related objective lens for DVD (as indicated by dashed lines). The vertical and horizontal axes of the graphs in FIGS. 20A and 20B represent the same as in the first embodiment.

FIG. 20A shows both the aberration that occurs when information is reproduced from a DVD with the objective lens of the fourth embodiment (as indicated by solid lines) and the aberration that occurs when information is reproduced from a DVD with the related objective lens for DVD which has no annular ridges (as indicated by dashed lines). FIG. 20B shows both the aberration that occurs when information is reproduced from a CD with the objective lens of the fourth embodiment (as indicated by solid lines) and the aberration that occurs when information is reproduced from a CD with the related objective lens for DVD which has no annular ridges (as indicated by dashed lines).

As is clear from FIGS. 20A and 20B, obvious changes occur in the aberration profiles of the objective lens of the fourth embodiment, particularly in the areas that correspond to the annular ridges formed on that objective lens.

Stated more specifically with reference to FIG. 20A that shows the aberrations that occur when information is reproduced from a DVD, the area corresponding to the first annular ridge 11 is obviously within the limits of ρ15 and ρ16 and the aberration develops in a position offset about one wavelength in the negative direction. The area corresponding to the second annular ridge 12 is obviously within the limits of ρ16 and ρ17 and the aberration develops in a position offset about two wavelengths in the negative direction. The area corresponding to the third annular ridge 13 is obviously within the limits of ρ17 and ρ18 and the aberration develops in a position offset about three wavelengths in the negative direction. The area corresponding to the fourth annular ridge 14 is obviously within the limits of ρ18 and ρ19 and the aberration develops in a position offset about four wavelengths in the negative direction. The area corresponding to the fifth annular ridge 15 is obviously within the limits of ρ19 and ρ20 and the aberration develops in a position offset about five wavelengths in the negative direction.

The reason for these offsets is that as already mentioned, the heights of the respective annular ridges are set at such values that the difference in optical pathlength between an area that does not have any annular ridge and an area where an annular ridge is formed is substantially equal to an integral multiple of the wavelength for information reproduction from a DVD.

With reference to FIG. 20B that shows the aberrations that occur when information is reproduced from a CD, the area corresponding to the first annular ridge 11 is obviously within the limits of ρ15 and ρ16 and the aberration develops in a position offset about one wavelength in the negative direction. The area corresponding to the second annular ridge 12 is obviously within the limits of ρ16 and ρ17 and the aberration develops in a position offset about two wavelengths in the negative direction. The area corresponding to the third annular ridge 13 is obviously within the limits of ρ17 and ρ18 and the aberration develops in a position offset about three wavelengths in the negative direction. The area corresponding to the fourth annular ridge 14 is obviously within the limits of ρ18 and ρ19 and the aberration develops in a position offset about four wavelengths in the negative direction. The area corresponding to the fifth annular ridge 15 is obviously within the limits of ρ19 and ρ20 and the aberration develops in a position offset about five wavelengths in the negative direction.

The reason for these offsets is that as already mentioned, the heights of the respective annular ridges are set at such values that the difference in optical pathlength between an area having no annular ridges and an area where an annular ridge is formed is substantially equal to an integral multiple of the wavelength of the light used to reproduce information from a DVD. Stated more specifically, if information is reproduced with light of the wavelength for CD in the presence of annular ridges that are set at values substantially equal to integral multiples of the wavelength for DVD, the difference in wavelength contributes to a small decrease in aberrations, thus causing aberrations to develop in areas corresponding to values substantially near integral multiples of the wavelength for CD.

Thus, in the fourth embodiment of the present invention, the number of annular ridges, as well as their positions and depths are so set that the aberrations developing in areas that correspond to the annular ridges assume values that are substantially equal to integral multiples of the wavelength for DVD.

Figure 21A:
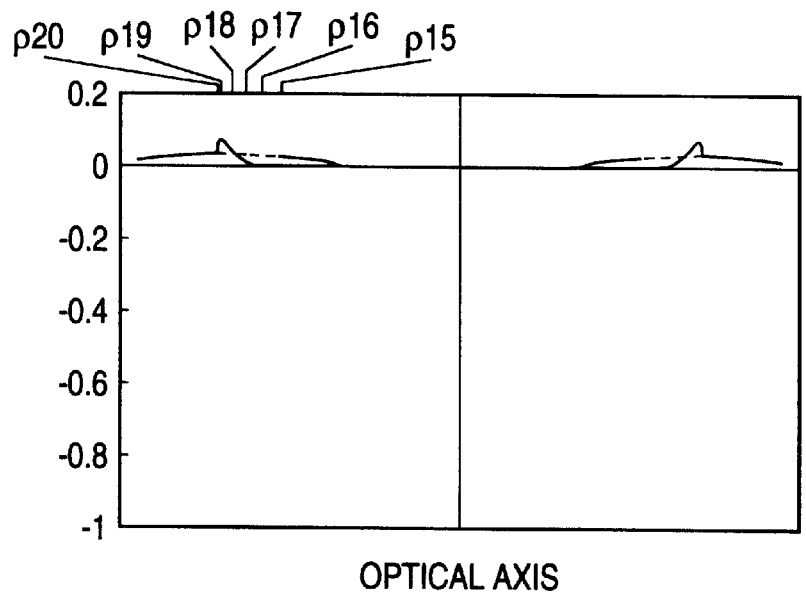
FIGS. 21A and 21B show the-aberration characteristics of the objective lens of the fourth embodiment minus phase jump.
Figure 21B:
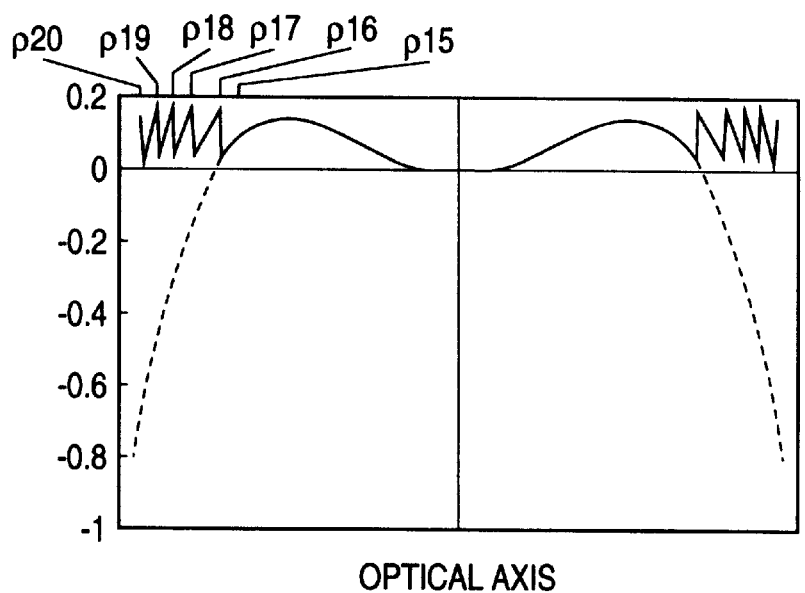

FIGS. 21A and 21B show the aberrations which take off the phase jump from the aberrations in the application of the objective lens of the fourth embodiment (as indicated by solid lines) and the aberrations according to the reproduction of the related objective lens for DVD (as indicated by dashed lines). Again, the vertical and horizontal axes of the graphs in FIGS. 21A and 21B represent the same as in the first embodiment.

FIG. 21A shows both the aberration that occurs when information is reproduced from a DVD with the objective lens of the fourth embodiment minus the phase jump (as indicated by solid lines) and the aberration that occurs when information is reproduced from a DVD with the related objective lens for DVD which has no annular ridges (as indicated by dashed lines). FIG. 21B shows both the aberration that occurs when information is reproduced from a CD with the objective lens of the fourth embodiment minus the phase jump (as indicated by solid lines) and the aberration that occurs when information is reproduced from a CD with the related objective lens for DVD which has no annular ridges (as indicated by dashed lines).

In short, FIGS. 21A and 21B show how much the t aberrations shown in FIGS. 20A and 20B deviate from integral multiples of the wavelength for DVD.

As is clear from FIG. 21A, the aberration that occurs when information is reproduced from a DVD with the objective lens of the fourth embodiment minus the phase jump (as indicated by solid lines) is somewhat greater than the aberration from the related objective lens (indicated by dashed lines) but it is not great enough to affect the characteristics of information reproduction. On the other hand, as is clear from FIG. 21B, the aberration that occurs when information is reproduced from a CD with the objective lens of the fourth embodiment minus the phase jump (as indicated by solid lines) is considerably smaller than the aberration from the related objective lens (indicated by dashed lines).

Thus, it is clear that the annular ridges contribute to improve the aberration characteristics for CD while hardly affecting the aberration characteristics for DVD.

Figure 22A:
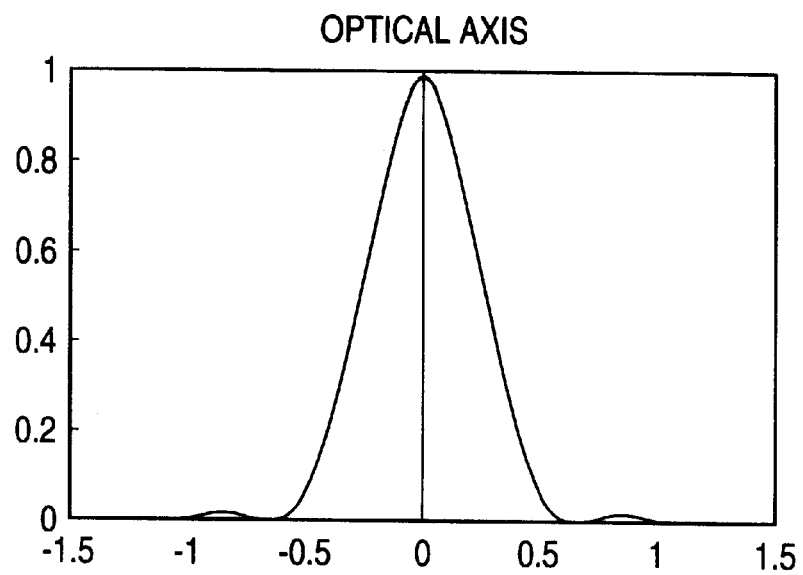
FIGS. 22A and 22B show the shapes of the spots formed with the objective lens of the fourth embodiment.
Figure 22B:
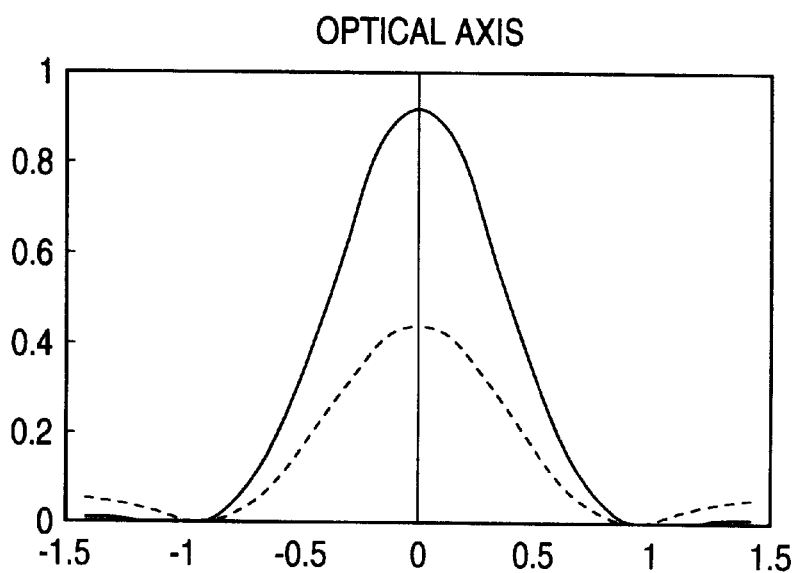

FIGS. 22A and 22B show the shapes of the spots formed on a disc when the objective lens of the fourth embodiment is applied (as indicated by solid lines) and the shapes of the spots formed on a disc when the related objective lens for DVD is applied (as indicated by dashed lines). Again, the vertical and horizontal axes of each graph represent the same as in the first embodiment.

FIG. 22A shows the shape of the spot formed on a disc when information is reproduced from a DVD with the objective lens of the fourth embodiment (as indicated by a solid line) and the shape of the spot formed on a disc when information is reproduced from a DVD with the related objective lens for DVD having no annular ridges (as indicated by a dashed line). FIG. 22B shows the shape of the spot formed on a disc when information is reproduced from a CD with the objective lens of the fourth embodiment (as indicated by a solid line) and the shape of the spot formed on a disc when information is reproduced from a CD with the related objective lens for DVD having no annular ridges (as indicated by a dashed line).

As is clear from FIG. 22A, when information was reproduced from a DVD with the objective lens of the fourth embodiment, the resulting spot shape and Strehl ratio were substantially the same as those in the related case, with little change observed. It is therefore clear that the performance of the objective lens was little affected by the formation of the annular ridges.

On the other hand, as is clear from FIG. 22B, when information was reproduced from a CD with the objective lens of the fourth embodiment, the resulting Strehl ratio increased markedly from the related value, the Strehl ratio was at least 0.8 in the region of NA=0.45, and the occurrence of side lobes was minimal. Thus, with the annular ridges formed on the objective lens, the quality of beam spots is improved.

Thus, by forming annular ridges on the objective lens as shown in FIGS. 19A and 19B, the characteristics of information reproduction from a CD could be considerably improved while hardly affecting the characteristics of information reproduction from a DVD.

In the fourth embodiment, the annular ridges are formed as shown in FIGS. 19A and 19B but as in the first embodiment their number, positions and heights are by no means limited to the illustrated case. The number of the annular ridges, their positions and heights suffice to be appropriately set considering the aberration characteristics for DVD that are shown in FIG. 21A. As for the heights of the annular ridges, it is preferred to select values near h that is defined by Eq. 3.

Figure 23:
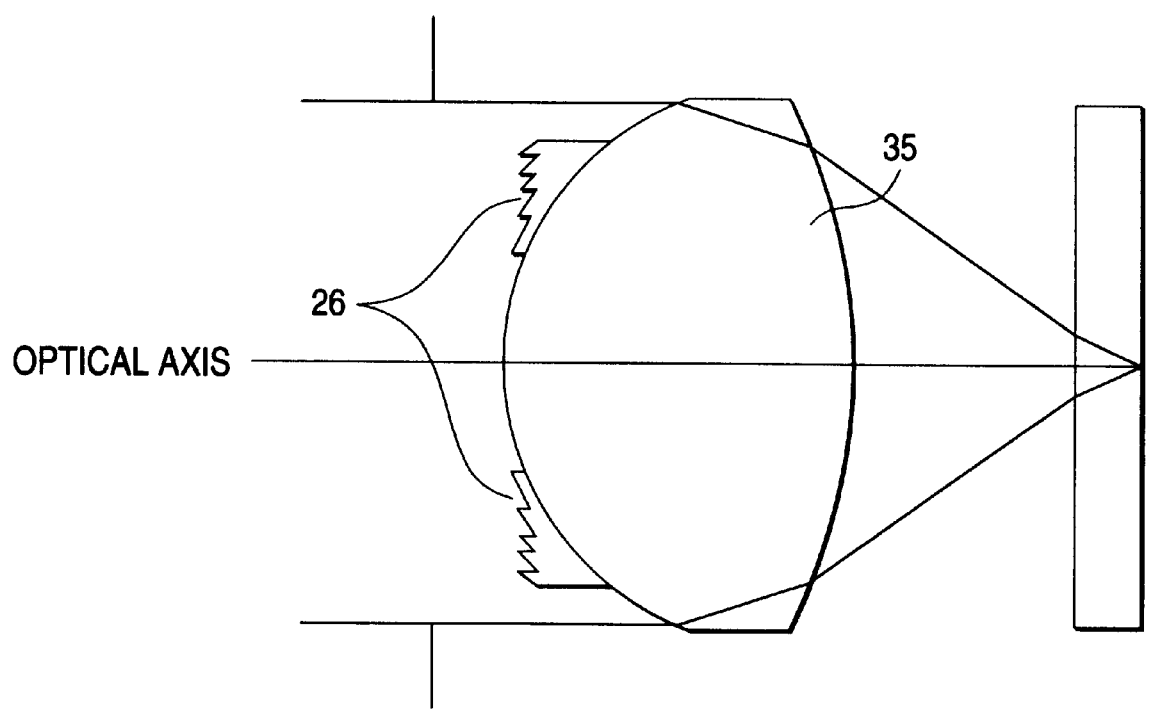
FIG. 23 shows a modification of the objective lens of the fourth embodiment.

FIG. 23 shows a modification of the fourth embodiment, in which an annular ridge assembly 26 is attached to the objective lens 35 to produce the same lens geometry as shown in FIGS. 19A and 19B. All that is needed is to create the lens geometry that is shown in FIGS. 19A and 19B. The annular ridge assembly 26 to be attached is preferably made of the same material as the objective lens 35.

As descried above, the first to fourth embodiments relate to the case of providing annular grooves and/or ridges on the first surface 35A of the objective lens 35. The provision of the annular grooves and/or ridges enabled the reproduction of information from recording media of different thicknesses by means of a single objective lens; particularly in the case of a compatible player that is designed to reproduce information from both a DVD and a CD, the aberrations that occurred in reproduction from a CD could be effectively reduced with a minimal sacrifice of the reproduction characteristics for DVD; hence, the design under consideration can simplify the construction of the pickup and is also suitable for reducing its size.

Annular grooves can be formed on the second surface 35B rather than the first surface 35A of the objective lens and this alternative case is described below in detail as the fifth embodiment of the present invention.

(Fifth Embodiment)

Figure 24A:
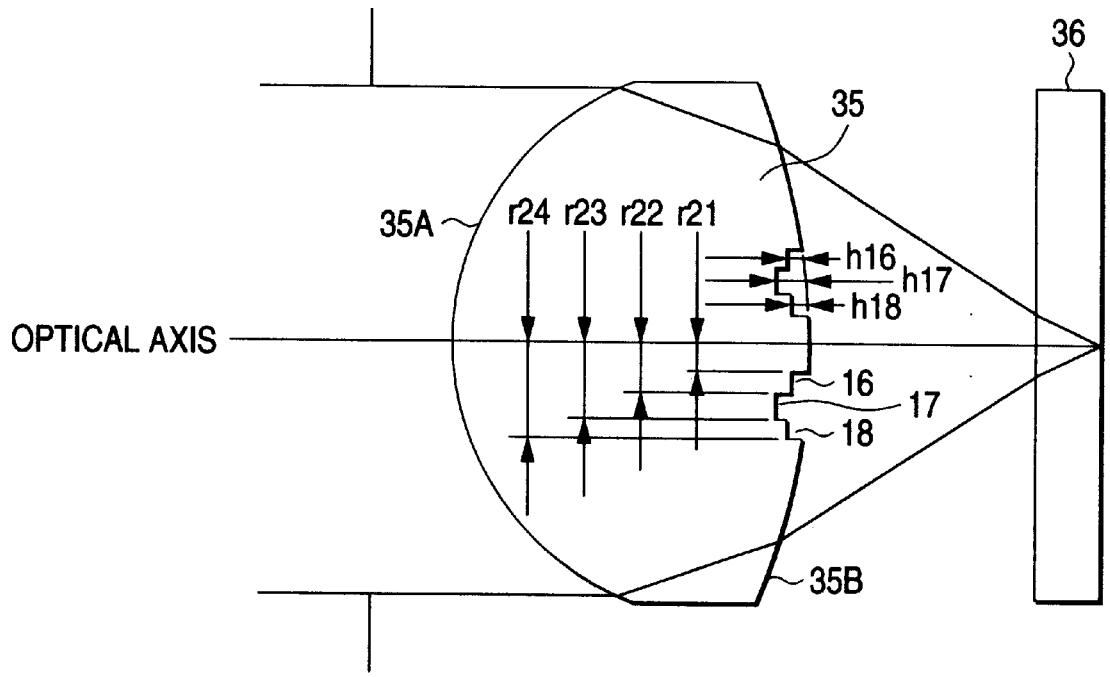
FIGS. 24A and 24B show the objective lens according to a fifth embodiment of the invention.
Figure 24B:
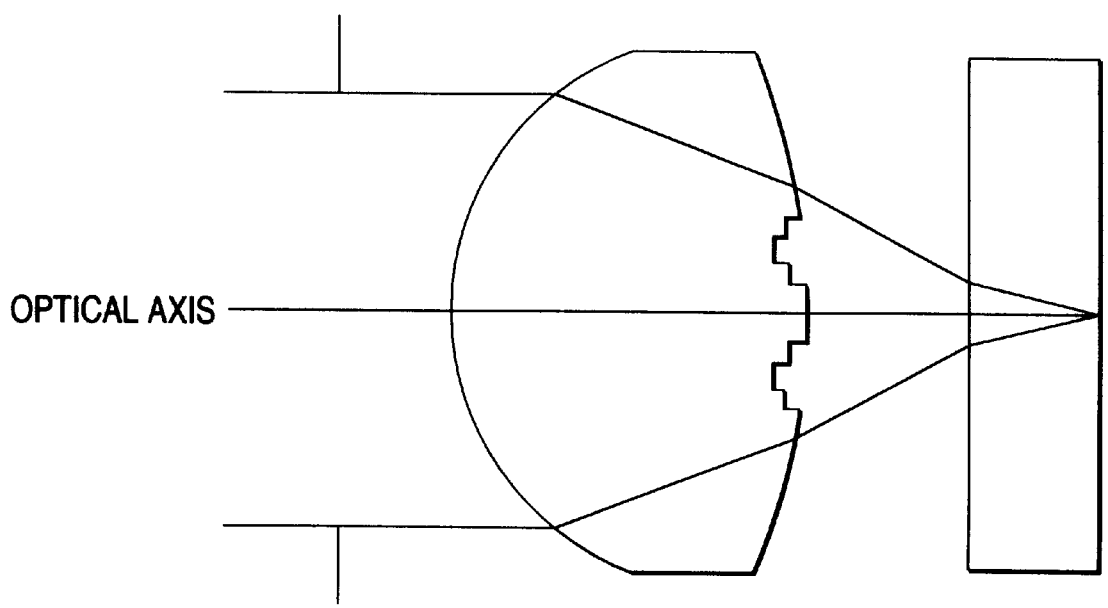

FIG. 24 shows the objective lens according to a fifth embodiment of the present invention. FIG. 24A shows the optical path of a wavelength of 650 nm to reproduce information from a DVD. FIG. 24B shows the optical path of a wavelength of 780 nm to reproduce information from a CD. Note that the optical path shown in FIG. 24B is under the same conditions as in the first embodiment.

In the fifth embodiment, the objective lens 35 basically set for DVD is applied to reproduce information from a CD with the following design. The position of the objective lens as calculated from the CD's recording surface is set to coincide with the position where minimal RMS aberrations occur in the region of NA=0.45. In this position, the surface geometry of the objective lens is improved so as to further decrease the RMS aberrations.

The construction and basic characteristics of the objective lens of the fifth embodiment are also essentially the same as those of the objective lens of the first embodiment and need not be described here in detail. The only differences are about the number of annular grooves and their positions and depths, as described below in detail.

In the objective lens 35 shown in FIGS. 24A and 24B, the radii and depths of annular grooves 16 to 18 are set at the values shown in the following Table 7.

TABLE 7

Data on the annular grooves in the fifth embodiment

|  | Radius of inner circumference, mm | Radius of outer circumference, mm | Depth of groove, μm |
|---|---|---|---|
| First ring 16 | 0.314 (r21) | 0.495 (r22) | 1.22 (h16) |
| Second ring 17 | 0.495 (r22) | 0.882 (r23) | 2.44 (h17) |
| Third ring 18 | 0.882 (r23) | 0.954 (r24) | 1.22 (h18) |

As in the first embodiment, the depths h of the three annular grooves are set at such values that the difference in optical pathlength between an area that does not have any annular groove and an area where an annular groove is formed is substantially equal to an integral multiple of the wavelength for information reproduction from a DVD. If annular grooves are formed on the second surface 35B of the objective lens 35, the light beam that is incident on the bottom of each annular groove after passing through the objective lens passes through its second surface at an angle with respect to the depth of each annular groove. Considering this fact, the depths h of the respective annular grooves are set to be somewhat smaller than in the first embodiment.

Figure 25A:
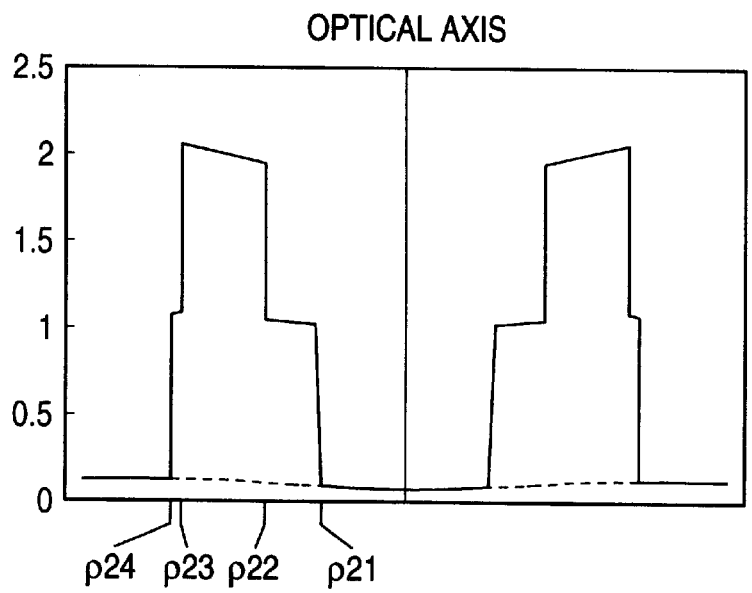
FIGS. 25A and 25B show the aberration characteristics of the objective lens of the fifth embodiment.
Figure 25B:
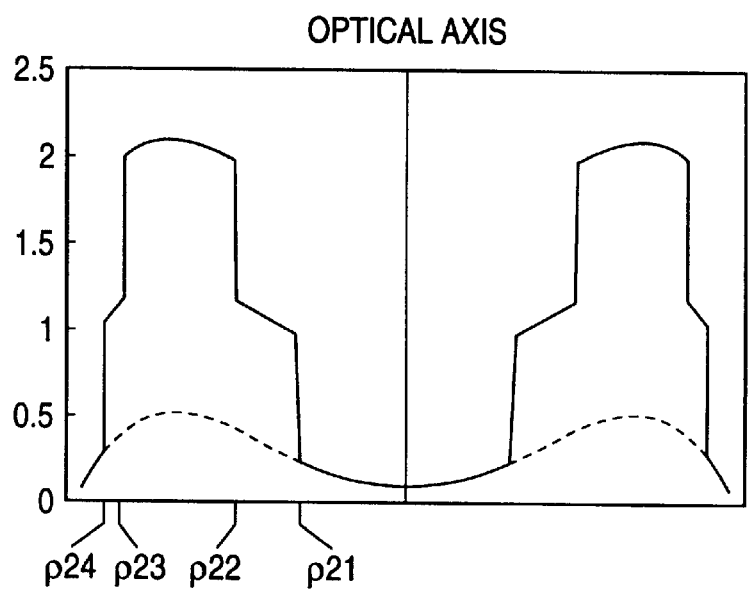

FIGS. 25A and 25B show the aberrations that occur when the objective lens of the fifth embodiment is applied (as indicated by solid lines) and the aberrations that occur from the related objective lens for DVD (as indicated by dashed lines). The vertical and horizontal axes of the graphs in FIGS. 25A and 25B represent the same as in the first embodiment.

FIG. 25A shows both the aberration that occurs when information is reproduced from a DVD with the objective lens of the fifth embodiment (as indicated by solid lines) and the aberration that occurs when information is reproduced from a DVD with the related objective lens for DVD which has no annular grooves (as indicated by dashed lines). FIG. 25B shows both the aberration that occurs when information is reproduced from a CD with the objective lens of the fifth embodiment (as indicated by solid lines) and the aberration that occurs when information is reproduced from a CD with the related objective lens for DVD which has no annular grooves (as indicated by dashed lines).

As is clear from FIGS. 25A and 25B, obvious changes occur in the aberration profiles of the objective lens of the fifth embodiment, particularly in the areas that correspond to the annular grooves formed on that objective lens.

Stated more specifically with reference to FIG. 25A that shows the aberrations that occur when information is reproduced from a DVD, the area corresponding to the first annular groove 15 is obviously within the limits of ρ21 and ρ22 and the aberration develops in a position offset about one wavelength. The area corresponding to the second annular groove 17 is obviously within the limits of ρ22 and ρ23 and the aberration develops in a position offset about two wavelengths. The area corresponding to the third annular groove 18 is obviously within the limits of ρ23 and ρ24 and the aberration develops in a position offset about one wavelength.

The reason for those offsets in that as already mentioned, the depths of the respective annular grooves are set at such values that the difference in optical pathlength between an area that does not have any annular groove and an area where an annular groove is formed is substantially equal to an integral multiple of the wavelength of the light used to reproduce information from a DVD.

With reference to FIG. 25B that shows the aberrations that occur when information is reproduced from a CD, the area corresponding to the first annular groove 16 is obviously within the limits of ρ21 and ρ22 and the aberration develops in a position offset about one wavelength. The area corresponding to the second annular groove 17 is obviously within the limits ρ22 and ρ23 and the aberration develops in a position offset about two wavelength. The area corresponding to the third annular groove 18 is obviously within the limits of ρ23 and ρ24 and the aberration develops in a position offset about one wavelength.

The reason for these offsets is because as already mentioned, the depths of the respective annular grooves are set at such values that the difference in optical pathlength between an area that does not have any annular groove and an area where an annular groove is formed is substantially equal to an integral multiple of the wavelength of the light used to reproduce information from a DVD. Stated more specifically, if information is reproduced with light of the wavelength for CD in the presence of annular grooves that are set at values substantially equal to integral multiples of the wavelength for DVD, the difference in wavelength contributes to a small decrease in aberrations, thus causing aberrations to develop in areas corresponding to values substantially near integral multiples of the wavelength for CD.

Thus, in the fifth embodiment of the present invention, the number of annular grooves, as well as their positions and depths are so set that the aberrations developing in areas that correspond to the annular grooves assume values that are substantially equal to integral multiples of the wavelength for DVD.

Figure 26A:
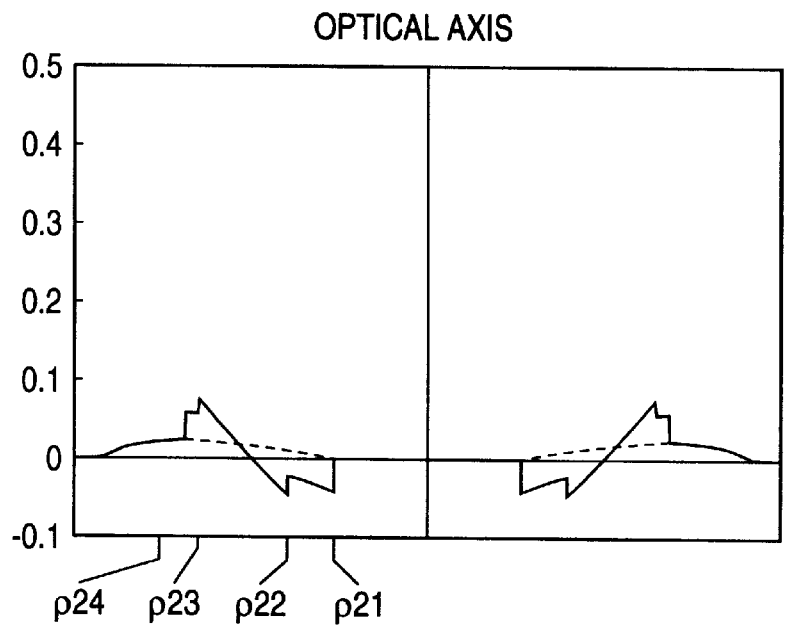
FIGS. 26A and 26B show the aberration characteristics of the objective lens of the fifth embodiment minus phase jump.
Figure 26B:
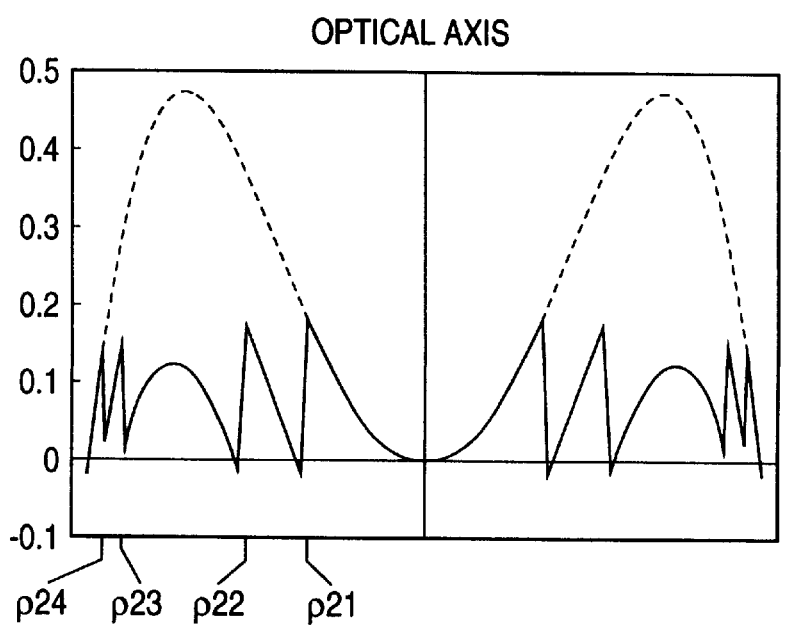

FIGS. 26A and 26B show the aberrations which take off the phase jump from the aberrations in the application of the objective lens of the fifth embodiment (as indicated by solid lines) and the aberrations that occur from the related objective lens for DVD (as indicated by dashed lines). Again, the vertical and horizontal axes of the graphs in FIGS. 26A and 26B represent the same as in the first embodiment.

FIG. 26A shows both the aberration that occurs when information is reproduced from a DVD with the objective lens of the fifth embodiment minus the phase jump (as indicated by solid lines) and the aberration that occurs when information is reproduced from a DVD with the related objective lens for DVD which has no annular grooves (as indicated by dashed lines). FIG. 26B shows both the aberration that occurs when information is reproduced from a CD with the objective lens of the fifth embodiment minus the phase jump (as indicated by solid lines) and the aberration that occurs when information is reproduced from a CD with the related objective lens for DVD which has no annular grooves (as indicated by dashed lines).

In short, FIGS. 26A and 26B show how much the aberrations shown in FIGS. 25A and 25B deviate from integral multiples of the wavelength for DVD.

As is clear from FIG. 26A, the aberration that occurs when information is reproduced from a DVD with the objective lens of the fifth embodiment minus the phase jump (as indicated by solid lines) is somewhat greater than the aberration from the related objective lens (indicated by dashed lines) but it is not great enough to affect the characteristics of information reproduction. On the other hand, as is clear from FIG. 26B, the aberration that occurs when information is reproduced from a CD with the objective lens of the fifth embodiment minus the phase jump (as indicated by solid lines) is considerably smaller than the aberration from the related objective lens (indicated by dashed lines).

Thus, it is clear that the annular grooves contribute to improve the aberration characteristics for CD while hardly affecting the aberration characteristics for DVD.

Figure 27A:
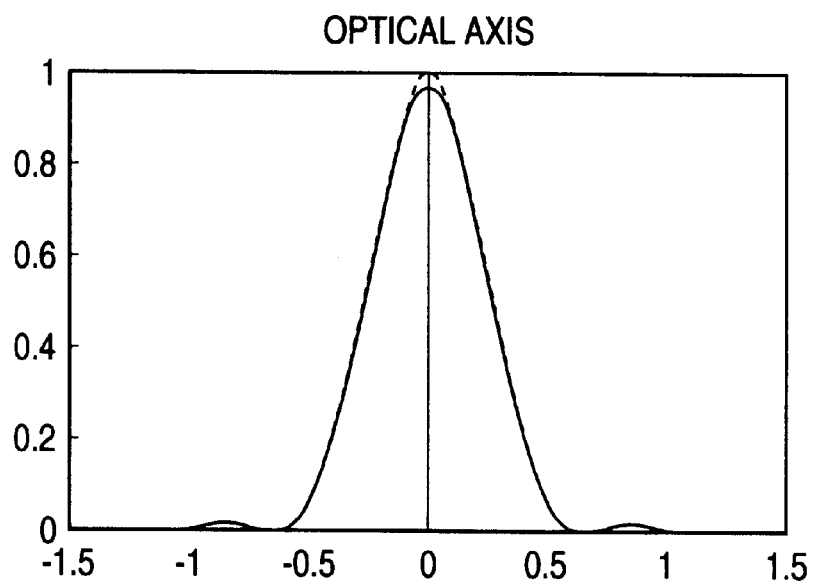
FIGS. 27A and 27B show the shapes of the spots formed with the objective lens of the fifth embodiment.
Figure 27B:
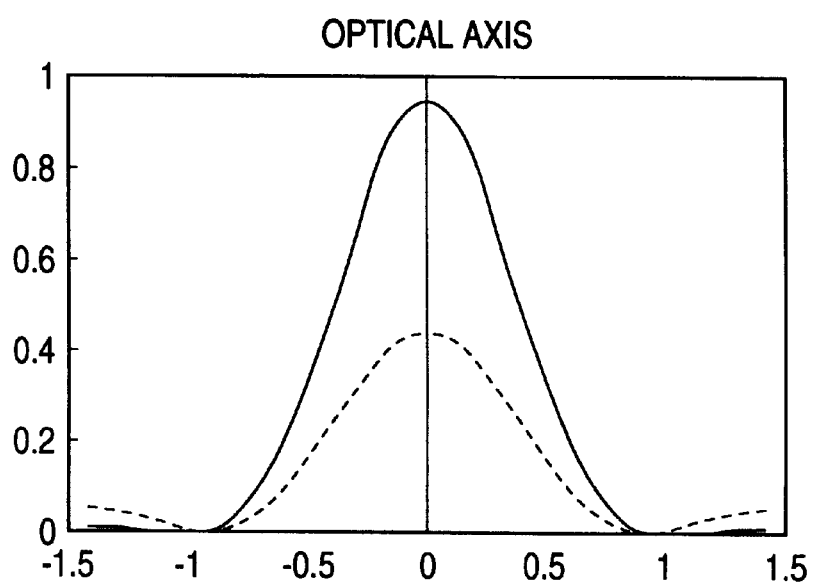

FIGS. 27A and 27B show the shapes of the spots formed on a disc when the objective lens of the fifth embodiment is applied (as indicated by solid lines) and the shapes of the spots formed on a disc when the related objective lens for DVD is applied (as indicated by dashed lines). Again, the vertical and horizontal axes of the graphs in FIGS. 27A and 27B represent the same as in the first embodiment.

FIG. 27A shows the shape of the spot formed on a disc when information is reproduced from a DVD with the objective lens of the fifth embodiment (as indicated by a solid line) and the shape of the spot formed on a disc when information is reproduced from a DVD with the related objective lens for DVD which has no annular grooves (as indicated by a dashed line). FIG. 27B shows the shape of the spot formed on a disc when information is reproduced from a CD with the objective lens of the fifth embodiment (as indicated by a solid line) and the shape of the spot formed on a disc when information is reproduced from a CD with the related objective lens for DVD having no annular grooves (as indicated by a dashed line).

As is clear from FIG. 27A, when information was reproduced from a DVD with the objective lens of the fifth embodiment, the resulting spot shape and Strehl ratio were substantially the same as those in the related case, with little change observed. It is therefore clear that the performance of the objective lens was little affected by the formation of the annular grooves.

On the other hand, as is clear from FIG. 27B, when information was reproduced from a CD with the objective lens of the fifth embodiment, the resulting Strehl ratio increased markedly from the related value, the Strehl ratio was at least 0.8 in the region of NA=0.45, and the occurrence of side lobes was minimal. Thus, with the annular grooves formed on the objective lens, the quality of beam spots is improved.

As described above, the objective lens 35 of the fifth embodiment has the annular grooves formed only on the second surface 35B. Even in that case, the same result is obtained as in the already described first to fourth embodiments in which the annular grooves are formed on the first surface 35A of the objective lens 35.

Thus, by forming annular grooves on the objective lens as shown in FIG. 24, the characteristics of information reproduction from CD could be considerably improved while hardly affecting the characteristics of information reproduction from a DVD.

In the fifth embodiment, the annular grooves are formed as shown in FIGS. 24A and 24B but as in the first embodiment their number, positions and depths are by no means limited to the illustrated case. The number of the annular grooves, their positions and depths suffice to be appropriately set considering the aberration characteristics for DVD that are shown in FIG. 26A. As for the depths of the annular grooves, it is preferred to select values near h that is defined by Eq. 3.

Mainly for the purpose of protecting the annular grooves, their surface may be provided with a cover or embedded in a coating. In such cases, an appropriate value of h may be determined by adjusting Eq. 2 considering the refractive index of the protective material.

Figure 28:
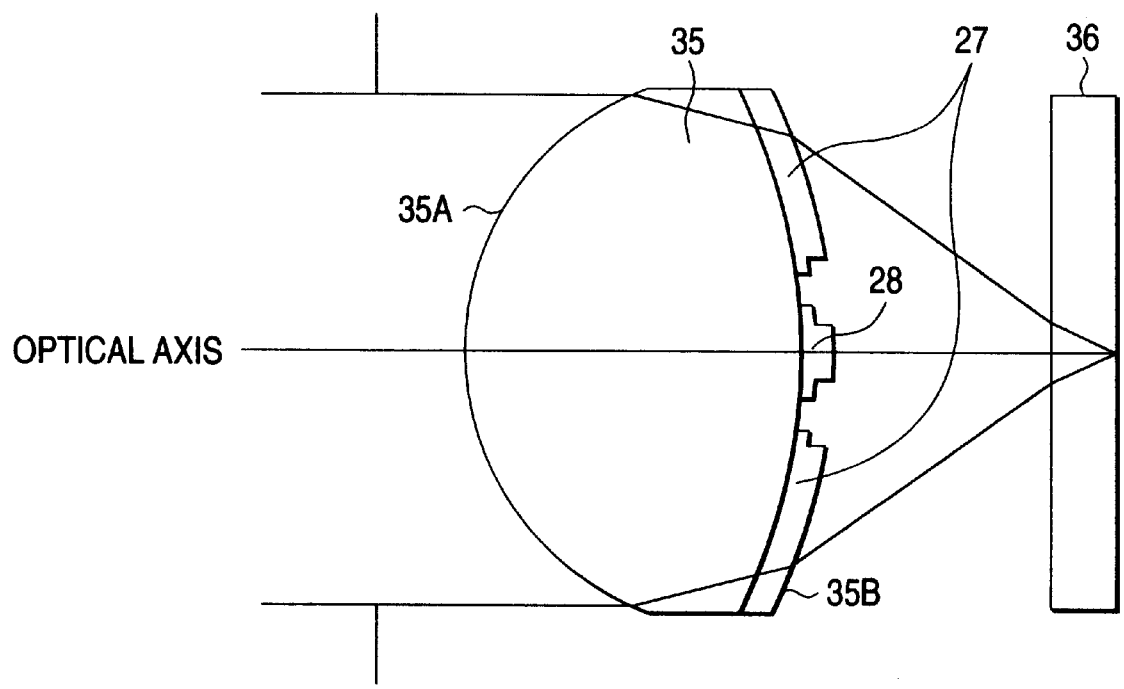
FIG. 28 shows a modification of the objective lens of the fifth embodiment.

FIG. 28 shows a modification of the fifth embodiment, in which annular ridges 27 and 28 are attached to the objective lens 35 to produce the same lens geometry as shown in FIG. 24. All that is needed is to create the lens geometry that is shown in FIG. 24A and 24B. The annular ridges 27 and 28 to be attached are preferably made of the same material as the objective lens 35.

As described above, the fifth embodiment relates to the case of providing annular grooves only on the second surface of the objective lens 35. The provision of the annular grooves can reproduce information from recording media of different thicknesses by means of a single objective lens; particularly in the case of a compatible player that is designed to reproduce information from both a DVD and a CD, the aberrations that occurred in reproduction from a CD could be effectively reduced with a minimal sacrifice of the reproduction characteristics for DVD; hence, the above construction of the pickup can simplified and is also suitable for reducing its size.

In the second to fourth embodiments, the position of the objective lens as calculated from the CD's recording surface was offset from the position where the RMS aberrations in the region of NA=0.45 would be minimal. The fifth embodiment may be modified in that way and yet the same result is obtained by providing annular grooves and/or ridges on the second surface 35B of the objective lens 35.

Annular grooves may be provided on both the first surface 35A and the second surface 35B of the objective lens 35 and this alternative case is described below in detail as the sixth embodiment of the present invention.

(Sixth Embodiment)

Figure 29A:
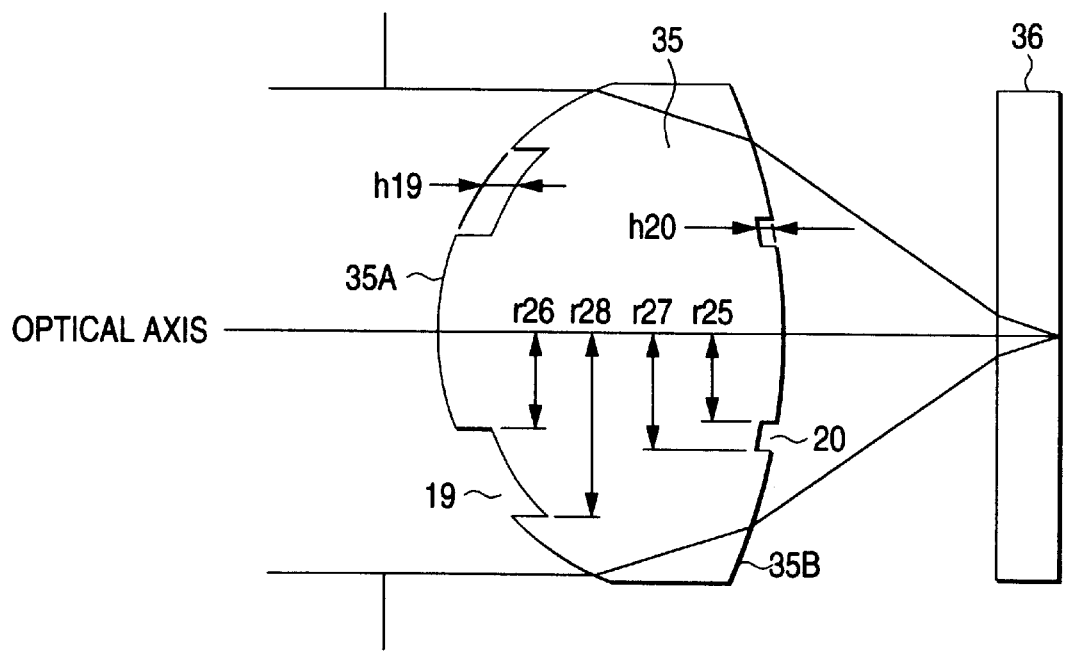
FIGS. 29A and 29B show the objective lens according to a sixth embodiment of the invention.
Figure 29B:
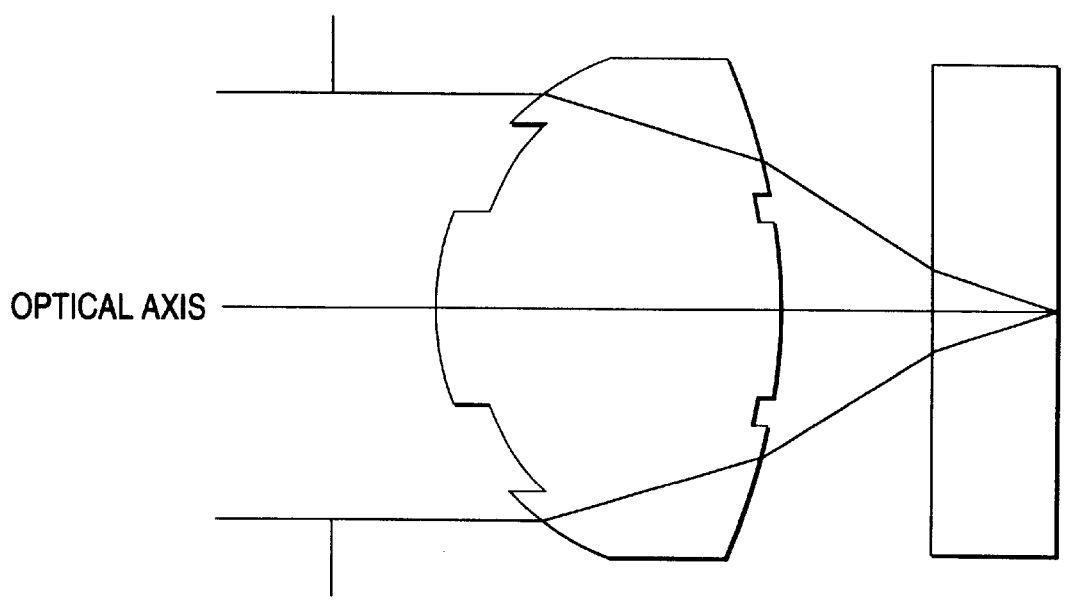

FIGS. 29A and 29B show the objective lens according to the sixth embodiment of the present invention.

In the sixth embodiment, the objective lens 35 basically set for DVD is applied to reproduce information from a CD with the following design. The position of the objective lens as calculated from the CD's recording surface is set to coincide with the position where minimal RMS aberrations occur in the region of NA=0.45. In this position, the surface geometry of the objective lens is improved so as to further decrease the RMS aberrations.

The construction and basic characteristics of the objective lens of the sixth embodiment are also essentially the same as those of the objective lens of the first embodiment and need not be described here in detail. The only differences are about the number of annular grooves and their positions and depths, as described below in detail.

In the objective lens 35 shown in FIG. 29A and 29B, the radii and depths of annular grooves 19 and 20 are set at the values shown in the following Table 8.

TABLE 8

Data on the annular grooves in the sixth embodiment

| | Radius of inner circumference, mm | Radius of outer circumference, mm | Depth of groove, μm |
|---|---|---|---|
| First ring 19 | 0.468 (r26) | 1.412 (r28) | 1.37 (h19) |
| Second ring 20 | 0.449 (r25) | 0.852 (r28) | −1.22 (h20) |

As in the first embodiment, the depths h of the two annular grooves are set at such values that the difference in optical pathlength between an area that does not have any annular groove and an area where an annular groove is formed is substantially equal to an integral multiple of the wavelength for information reproduction from a DVD. If an annular groove is formed on the second surface 35B of the objective lens 35, its depth h is set to be somewhat smaller than when a similar groove is formed on the first surface 35A (the reason for this difference in the groove's depth was given in the fifth embodiment).

FIG. 29A shows the optical path of a wavelength of 650 nm to reproduce information from a DVD. FIG. 29B shows the optical path of a wavelength of 780 nm to reproduce information from a CD. Note that the optical path shown in FIG. 29B is under the same conditions as in the first embodiment.

Figure 30A:
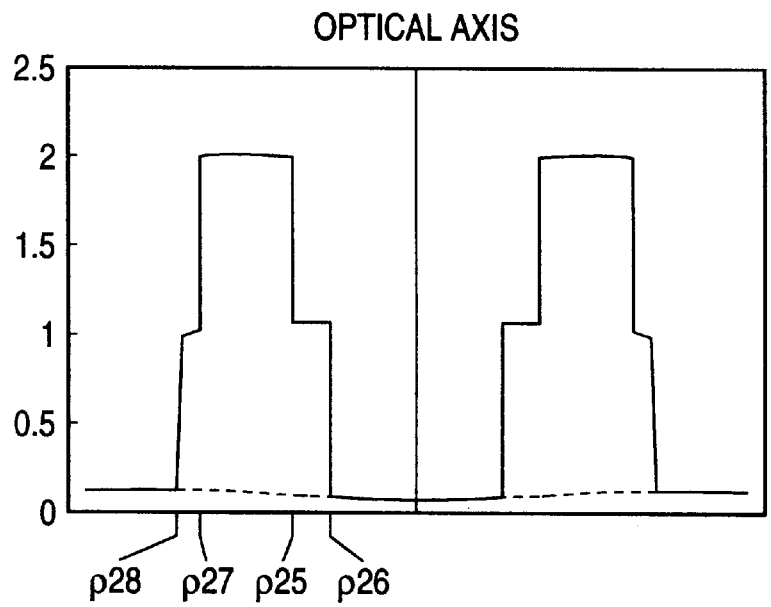
FIGS. 30A and 30B show the aberration characteristics of the objective lens of the sixth embodiment.
Figure 30B:
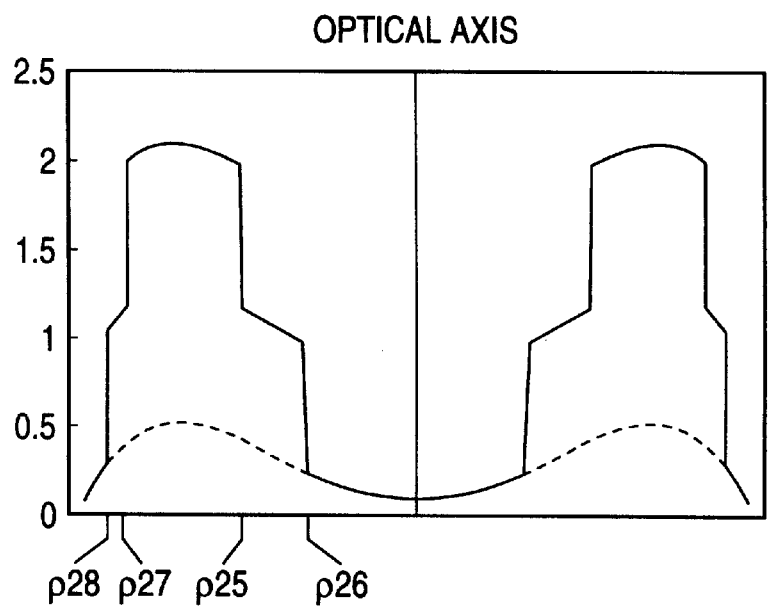

FIGS. 30A and 30B show the aberrations that occur when the objective lens of the sixth embodiment is applied (as indicated by solid lines) and the aberrations that occur from the related objective lens for DVD (as indicated by dashed lines). The vertical and horizontal axes of the graphs in FIGS. 30A and 30B represent the same as in the first embodiment.

FIG. 30A shows both the aberration that occurs when information reproduced from a DVD with the objective lens of the sixth embodiment (as indicated by solid lines) and the aberration that occurs when information is reproduced from a DVD with the related objective lens for DVD which has no annular grooves (as indicated by dashed lines). FIG. 30B shows both the aberration that occurs when information is reproduced from a CD with the objective lens of the sixth embodiment (as indicated by solid lines) and the aberration that occurs when information is reproduced from a CD with the related objective lens for DVD which has no annular grooves (as indicated by dashed lines).

As is clear from FIGS. 30A and 30B, obvious changes occur in the aberration profiles of the objective lens of the sixth embodiment, particularly in the areas that correspond to the annular grooves formed on that objective lens.

Stated more specifically with reference to FIG. 30A t that shows the aberrations that occur when information is reproduced from a DVD, aberrational changes obviously occur within the limits of ρ26 and ρ28 when the incident light beam passes through the first annular groove 19 and the aberration develops in a position offset about one wavelength. When the light beam passes through both the first annular groove 19 and the second annular groove 20, an aberrational change obviously occurs within the limits ρ25 and ρ27 and the aberration develops in a position offset about two wavelengths.

The reason for these offsets is that as already mentioned, the depth of the respective annular grooves are set at such values that the difference in optical pathlength between an area that has no annular grooves and an area where an annular groove is formed is substantially equal to an integral multiple of the wavelength for information reproduction from a DVD.

With reference to FIG. 30B that shows the aberrations that occur when information is reproduced from a CD, aberrational changes obviously occur within the limits of ρ26 and ρ28 when the incident light beam passes through the first annular groove 19 and the aberration develops in a position offset about one wavelength. When the light beam passes through both the first annular groove 19 and the second annular groove 20, an aberrational change obviously occurs within the limits of ρ25 and ρ27 and the aberration develops in a position offset about two wavelengths.

The reason for these offsets is that as already mentioned, the depths of the respective annular grooves are set at such values that the difference in optical pathlength between an area that has no annular grooves and an area where an annular groove is formed is substantially equal to an integral multiple of the wavelength for information reproduction from a DVD. Stated more specifically, if information is reproduced with light of the wavelength for CD in the presence of annular grooves that are set at values substantially equal to integral multiples of the wavelength for DVD, the difference in wavelength contributes to a small decrease in aberrations, thus causing aberrations to develop in areas corresponding to values substantially near integral multiples of the wavelength for CD.

Thus, in the sixth embodiment of the present invention, the numbers of annular grooves, as well as their positions and depths are so set that the aberrations developing in areas that correspond to the annular grooves assume values that are substantially equal to integral multiples of the wavelength for DVD.

Figure 31A:
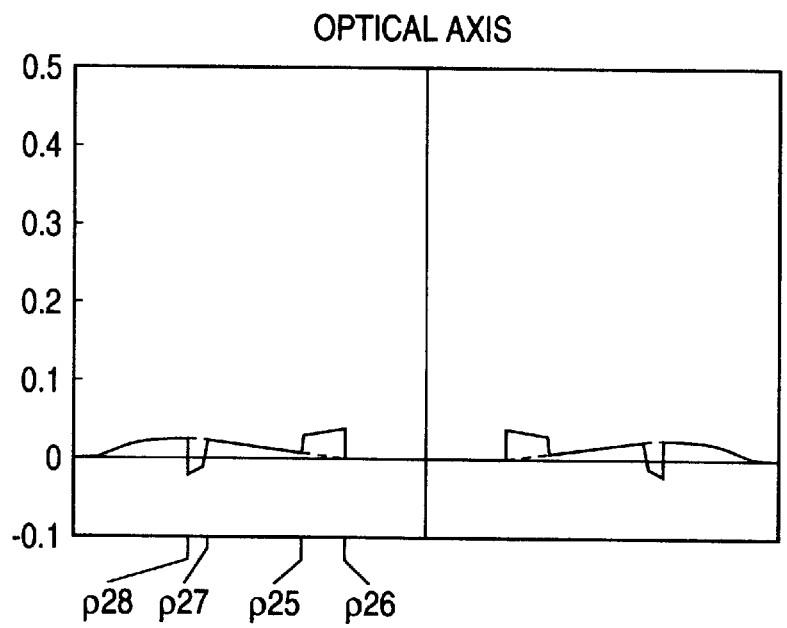
FIGS. 31A and 31B show the aberration characteristics of the objective lens of the sixth embodiment minus phase jump.
Figure 31B:
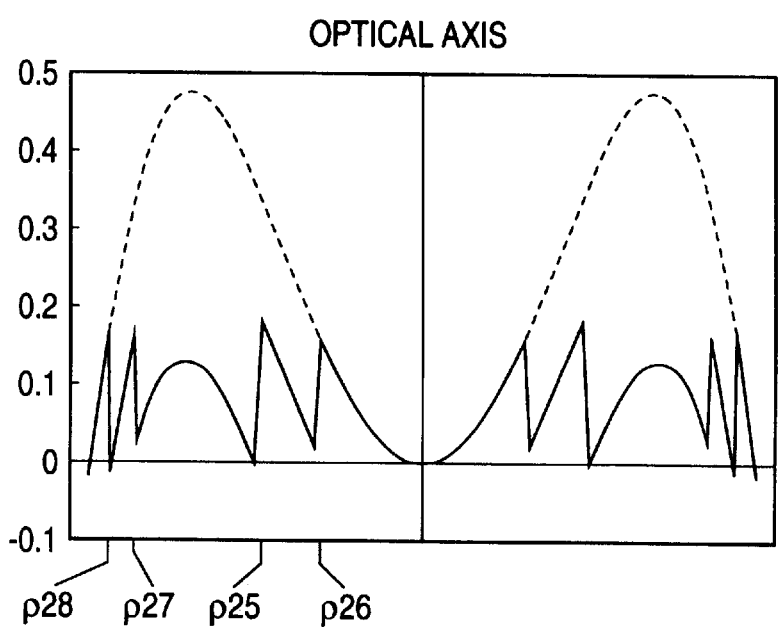

FIGS. 31A and 31B show the aberrations that takes off the phase jump from the aberrations in the application of the objective lens of the sixth embodiment (as indicated by solid lines) and the aberrations that occur from the related objective lens for DVD (as indicated by dashed lines). Again the vertical and horizontal axes of the graphs in FIGS. 31A and 31B represent the same as in the first embodiment.

FIG. 31A shows both the aberration that occurs when information is reproduced from a DVD with the objective lens of the sixth embodiment minus the phase jump (as indicated by solid lines) and the aberration that occurs when information is reproduced from a DVD with the related objective lens for DVD which has no annular grooves (as indicated by dashed lines). FIG. 31B shows both the aberration that occurs when information is reproduced from a CD with the objective lens of the sixth embodiment minus the phase jump (as indicated by solid lines) and the aberration that occurs when information is reproduced from a CD with the related objective lens for DVD which has no annular grooves (as indicated by dashed lines).

In short, FIGS. 31A and 31B show how much the aberrations shown in FIGS. 30A and 30B deviate from integral multiples of the wavelength for DVD.

As is clear from FIG. 31A, the aberration that occurs when information is reproduced from a DVD with the objective lens of the sixth embodiment minus the phase jump (as indicated by solid lines) is somewhat greater than the aberration from the related objective lens (indicated by dashed lines) but it is not great enough to affect the characteristics of information reproduction. On the other hand, as is clear from FIG. 31B, the aberration that occurs when information is reproduced from a CD with the objective lens of the sixth embodiment minus the phase jump (as indicated by solid lines) is considerably smaller than the aberration from the related objective lens (indicated by dashed lines).

Thus, it is clear that the annular grooves contribute to improve the aberration characteristics for CD while hardly affecting the aberration characteristics for DVD.

Figure 32A:
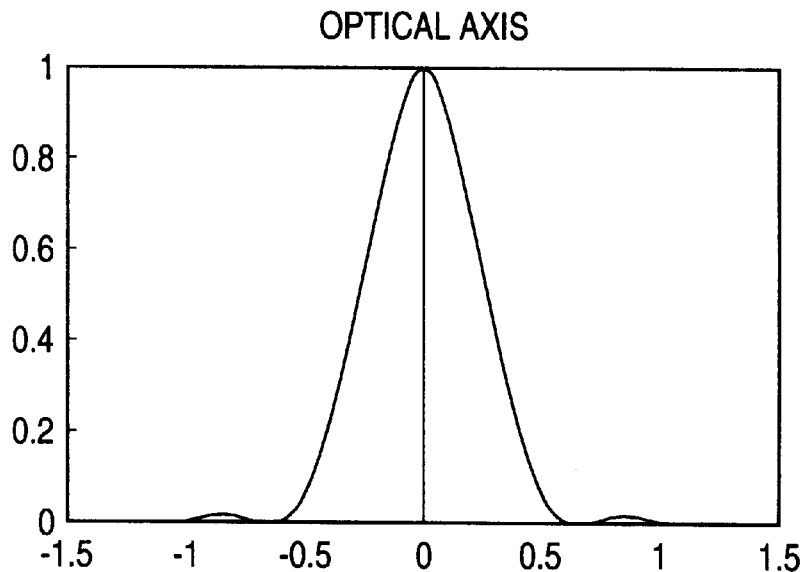
FIGS. 32A and 32B show the shapes of the spots formed with the objective lens of the sixth embodiment.
Figure 32B:
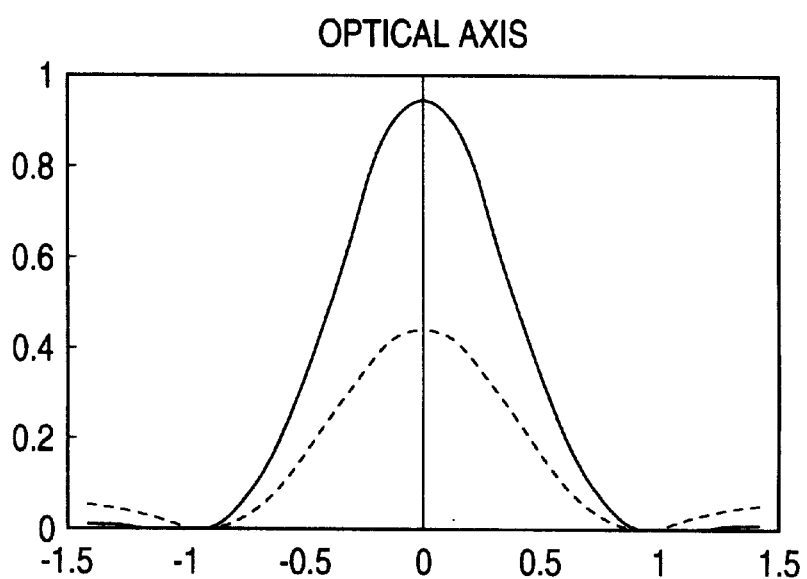

FIGS. 32A and 32B show the shapes of the spots formed on a disc when the objective lens of the sixth embodiment is applied (as indicated by solid lines) and the shapes of the spots formed on a disc when the related objective lens for DVD is applied (as indicated by dashed lines). Again, the vertical and horizontal axes of each graph represent the same as in the first embodiment.

FIG. 32A shows the shape of the spot formed on a disc when information is reproduced from a DVD with the objective lens of the sixth embodiment (as indicated by solid lines) and the shape of the spot formed on a disc when information is reproduced from a DVD with the related objective lens for DVD having no annular grooves (as indicated by dashed lines). FIG. 32B shows the shape of the spot formed on a disc when information is reproduced from a CD with the objective lens of the sixth embodiment (as indicated by solid lines) and the shape of the spot formed on a disc when information is reproduced from a CD with the related objective lens for DVD having no annular grooves (as indicated by dashed lines).

As is clear from FIG. 32A, when information was reproduced from a DVD with the objective lens of the sixth embodiment, the resulting spot shape and Strehl ratio were substantially the same as those in the related case, with little change observed. It is therefore clear that the performance of the objective lens was little affected by the formation of the annular grooves.

On the other hand, as is clear from FIG. 32B, when information was reproduced from a CD with the objective !lens of the sixth embodiment, the resulting Strehl ratio increased markedly from the related value, the Strehl ratio was at least 0.8 in the region of NA=0.45, and the occurrence of side lobes was minimal. Thus, with the annular grooves formed on the objective lens, the quality of beam spots is improved.

As described above, the objective lens 35 of the sixth embodiment has annular grooves formed on both the first surface 35A and the second surface 35B. Even in this case, the same result is obtained as in the already described first to fourth embodiments in which the annular grooves are formed on the first surface 35A of the objective lens 35.

Thus, by forming annular grooves on the objective lens as shown in FIGS. 29A and 29B, the characteristics of information reproduction from CD could be considerably improved while hardly affecting the characteristics of information reproduction from a DVD.

In the sixth embodiment, the annular grooves are formed as shown in FIGS. 29A and 29B but as in the first embodiment, their number, positions and depths are by no means limited to the illustrated case. The number of the annular grooves, their positions and depths suffice to be appropriately set considering the aberration characteristics for DVD that are shown in FIG. 31A. As for the depths of the annular grooves, it is preferred to select values near h that is defined by Eq. 3.

Mainly for the purpose of protecting the annular grooves, their surface may be provided with a cover or embedded in a coating. In such cases, an appropriate value of h may be determined by adjusting Eq. 2 considering the refractive index of the protective material.

Figure 33:
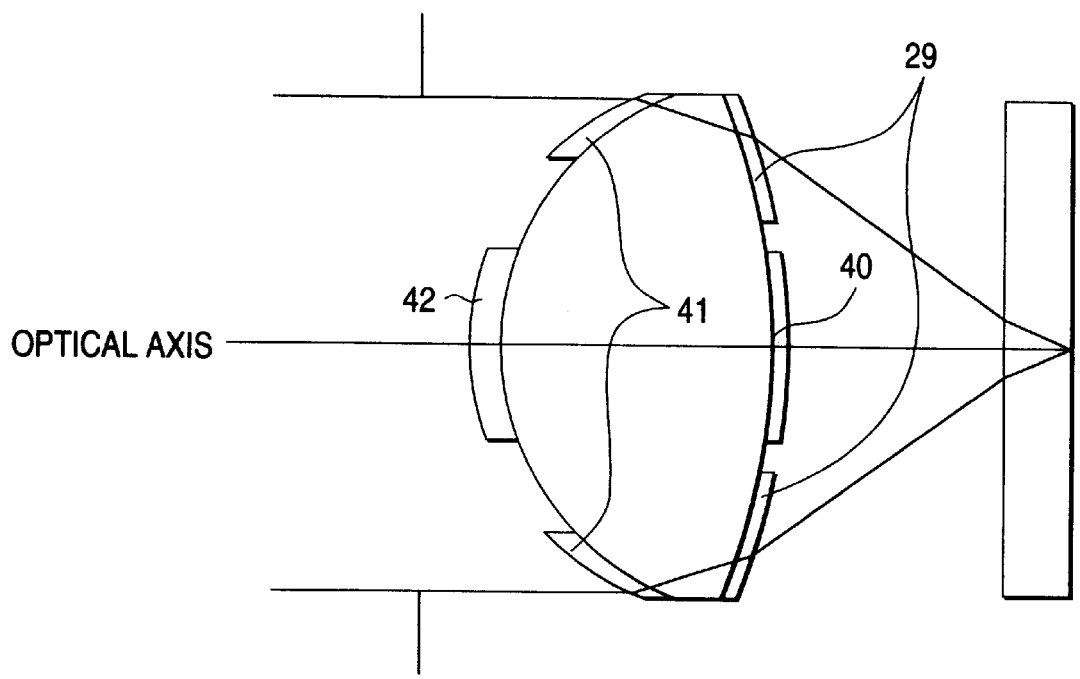
FIG. 33 shows a modification of the objective lens of the sixth embodiment.
Figure 34A:
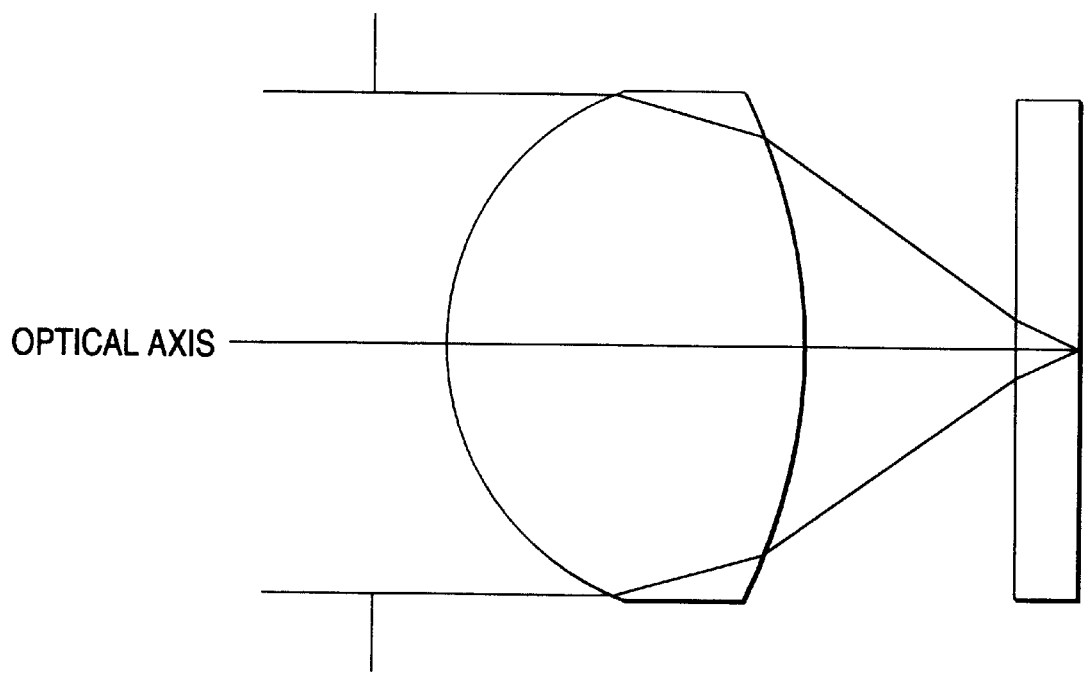
FIGS. 34A and 34B show a related objective lens.
Figure 34B:
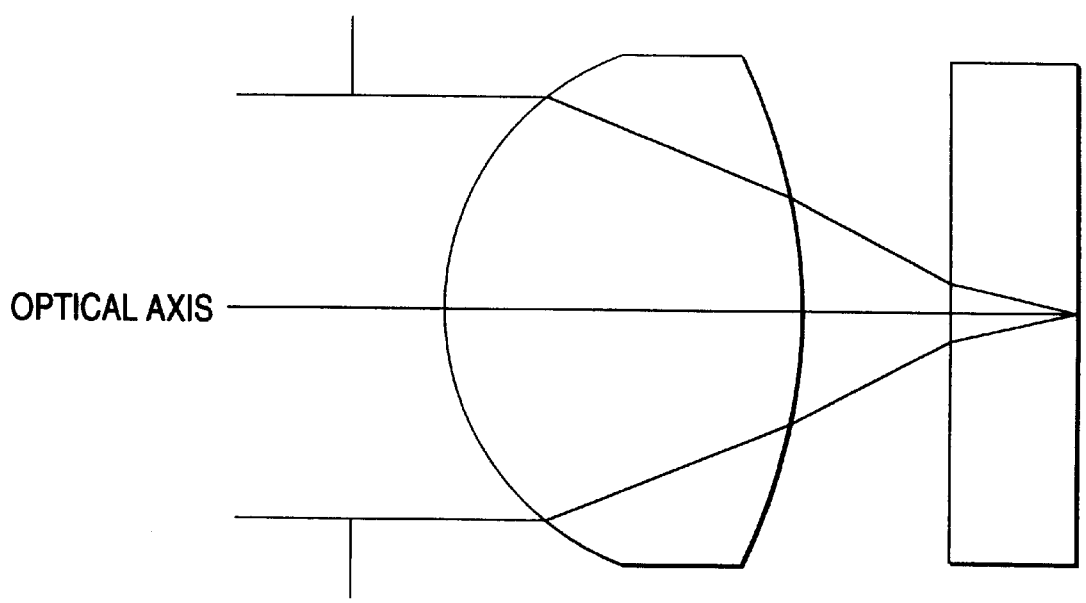

FIG. 33 shows a modification of the sixth embodiment, in which annular ridges 29, 40, 41 and 42 are attached to the objective lens 35 to produce the same lens geometry as shown in FIGS. 29A and 29B. All that is needed is to create the lens geometry that is shown in FIG. 29A and 29B. The annular ridges 29, 40, 41 and 42 to be attached are preferably made of the same material as the objective lens 35.

As described above, the sixth embodiment relates to the case of providing an annular groove on both the first surface 35A and the second surface 35B of the objective lens 35. The provision of the annular grooves can reproduce information from recording media of different thicknesses by means of a single objective lens; particularly in the case of a compatible player that is designed to reproduce information from both a DVD and a CD, the aberrations occurred in reproduction from a CD could be effectively reduced with a minimal sacrifice of the reproduction characteristics for DVD; hence, the above construction of the pickup can be simplified and is also suitable for reducing its size.

It should be noted here that the annular grooves and/or annular ridges that were described in the second to fourth embodiments may be distributed as appropriate between the first surface 35A and the second surface 35B; even this modification can achieve the same result.

As described the above, in the first to sixth embodiments of the invention, since there are provided a plurality of annular grooves and/or ridges in a surface of an objective lens on which light beams from light sources are introduced or emitted, this enables the reproduction of information from recording media of different thicknesses by means of a single objective lens; particularly in the case of a compatible player that is designed to reproduce information from both a DVD and a CD, the aberrations that occur in reproduction from a CD can be effectively reduced with a minimal sacrifice of the reproduction characteristics for DVD; hence, the design according to the present invention can simplify the construction of the pickup and is also suitable for reducing its size.

In the six embodiments described above, light sources emitting at two different wavelengths are used to reproduce information from two recording media of different thicknesses. The objective lens of the invention is also applicable to the case where chromatic aberrations develop in information reproduction from recording media of the same thickness using light sources emitting at two different wavelengths; in that case, the chromatic aberrations can be corrected by means of the objective lens of the invention.

In those six embodiments, it is assumed that the numbers of annular grooves and/or ridges, as well as their positions and depths or heights suffice to be set as appropriate considering the possible effects on the aberration characteristics for DVD; however, this is not the sole case of the invention and greater emphasis may be placed on the aberration characteristics for CD rather than on the aberration characteristics for DVD. In other words, the specific values of the parameters listed above suffice to be determined considering the aberration characteristics for the more important recording medium.

As described above, since there is provided a plurality of annular grooves and/or ridges in the surface of the objective lens on which light beams from light sources are introduced or the emitted, this enables the reproduction of information from recording media of different thicknesses by means of a single objective lens; hence, the design according to the invention can simplify the construction of a pickup and is also suitable for reducing its size.

The entire disclosure of each and every foreign patent application from which the benefit of foreign priority has been claimed in the present application is incorporated herein by reference, as if fully set forth.

The present disclosure relates to the subject matter contained in Japanese patent application No. Hei. 10-104009 filed on Mar. 31, 1998 which is expressly incorporated herein by reference in its entirety.

What is claimed is:

1. An objective lens for condensing a light beam, the objective lens comprising:
   an incident surface through which light enters the objective lens;
   an emission surface through which light is emitted from the objective lens; and
   an annular structure having at least one of a combination of an annular groove and an annular ridge, a combination of annular grooves, and a combination of annular ridges, said annular structure being formed concentrically on at least one of said incident surface and said emission surface, wherein a surface of said annular structure has a radius of curvature the same as that of the surface on which said combination is provided.

2. The objective lens according to claim 1, wherein said annular grooves and ridges are respectively provided only on the incident surface of the objective lens.

3. The objective lens according to claim 1, wherein said annular grooves and ridges are respectively provided only on the emission surface of the objective lens.

4. The objective lens according to claim 1, wherein said annular grooves and ridges are provided on both the incident surface and the emission surface of the objective lens.

5. The objective lens according to claim 1, wherein the depth h of said annular groove and the height h of said annular ridge are respectively given by:

$$h = m\lambda/(n1-1)$$

where m is a natural number, $\lambda$ is the wavelength of said light beam, and n1 is the refractive index of the objective lens.

6. The objective lens according to claim 1, wherein said objective lens having at least one of said annular grooves and ridges is formed by a single member.

7. An objective lens for condensing a light beam, the objective lens comprising:
   an incident surface through which light enters the objective lens;
   an emission surface through which light is emitted from the objective lens; and
   an annular structure having at least one of a combination of an annular groove and an annular ridge, a combination of annular grooves and a combination of annular ridges, said annular structure being formed concentrically on at least one of said incident surface and said emission surface,
   wherein said annular groove is defined by an outer side surface, an inner side surface, and a bottom surface,
   said outer and inner side surfaces are parallel with an optical axis of the objective lens, and
   the radius of the curvature of said bottom surface is the same as that of the surface on which said annular groove is provided.

8. The objective lens according to claim 7, wherein a depth h of said annular groove and a height h of said annular ridge are both respectively given by:

$$h = m\lambda/(n1-1)$$

where m is a natural number, $\lambda$ is the wavelength of said light beam, and n1 is the refractive index of the objective lens.

9. An objective lens for condensing a light beam, the objective lens comprising:
   an incident surface through which light enters the objective lens;
   an emission surface through which light is emitted from the objective lens; and
   an annular structure having at least one of a combination of an annular groove and an annular ridge, a combination of annular grooves, and a combination of annular ridges, said annular structure being formed concentrically on at least one of said incident surface and said emission surface,
   wherein said annular ridge is defined by an outer side surface, an inner side surface, and a top surface,
   said outer and inner side surfaces are parallel with an optical axis of the objective lens, and
   the radius of the curvature of said top surface is the same as that of the surface on which said annular ridge is provided.

10. The objective lens according to claim 9, wherein a depth h of said annular groove and a height h of said annular ridge are both respectively given by:

$$h = m\lambda/(n1-1)$$

where m is a natural number, $\lambda$ is the wavelength of said light beam, and n1 is the refractive index of the objective lens.

11. An objective lens for condensing a light beam the objective lens comprising:
   an incident surface through which light enters the objective lens;
   an emission surface through which light is emitted from the objective lens; and
   an annular structure baying at least one of a combination of an annular groove and an annular ridge, a combination of annular groves, and a combination of annular ridges, said annular structure being formed concentrically on at least one of said incident surface and said emission surface,
   wherein said objective lens includes a first member having uninterrupted incident and emission surfaces, and a second member to be attached to said first member so as to form said annular groove and ridge respectively,
   said second member being formed of the same material as said first member.

12. The objective lens according to claim 11, wherein a depth h of said annular groove and a height h of said annular ridge are both respectively given by:

$$h = m\lambda/(n1-1)$$

where m is a natural number, $\lambda$ is the wavelength of said light beam, and n1 is the refractive index of the objective lens.

13. An optical pickup device comprising:
   a first light source having a first wavelength for reading information from a first optical recording medium, said first optical recording medium having a first distance from a front surface to an information recording surface;
   a second light source having a second wavelength longer than said first wavelength for reading information from a second optical recording medium, said second optical recording medium having a second distance from a front surface to an information recording surface, which is different from said first distance; and
   an objective lens defined on the basis of a predetermined effective numerical aperture and a predetermined focal position for reading information from said first optical recording medium, said objective lens having at least one of the combination of an annular groove and an annular ridge, the combination of said annular grooves, and the combination of said annular ridges, said annular groove and ridge producing a phase difference, each of which is formed concentrically on at least one of an incident surface through which light beams from said light sources are introduced, and an emission surface through which said light beams introduced into said objective lens are emitted.

14. The optical pickup device according to claim 13, wherein said annular grooves and ridges provided on the incident surface of the objective lens are formed within the diameter of a region in the incident surface corresponding to a predetermined effective numerical aperture for reading information from said second optical recording medium when the light beam from said second light source is introduced into the objective lens.

15. The optical pickup device according to claim 13, wherein said annular grooves and ridges provided on the emission surface of the objective lens are formed within the diameter of a region in the emission surface which emits the light beam passing through the limit of the diameter of a region in the incident surface corresponding to a predetermined effective numerical aperture for reading information from said second optical recording medium when the light beam from said second light source is introduced into the objective lens.

16. The objective lens according to claim 13, wherein said annular grooves and ridges are respectively provided only on the incident surface of the objective lens.

17. The objective lens according to claim 13, wherein said annular grooves and ridges are respectively provided only on the emission surface of the objective lens.

18. The objective lens according to claim 13, wherein said annular grooves and ridges are provided on both the incident surface and the emission surface of the objective lens.

19. The optical pickup device according to claim 13, wherein the depth h of said annular groove and the height h of said annular ridge are respectively given by:

$$h = m\lambda/(n1-1)$$

where m is a natural number, $\lambda$ is said first wavelength, and n1 is the refractive index of the objective lens.

20. The objective lens according to claim 13, wherein said annular groove is defined by an outer side surface, an inner side surface, and a bottom surface,
   said outer and inner side surfaces are parallel with an optical axis of the objective lens, and
   the radius of the curvature of said bottom surface is the same as that of the surface on which said annular groove is provided.

21. The objective lens according to claim 13, wherein said annular ridge is defined by an outer side surface, an inner side surface, and a top surface,
   said outer and inner side surfaces are parallel with an optical axis of the objective lens, and
   the radius of the curvature of said top surface is the same as that of the surface on which said annular ridge is provided.

22. The objective lens according to claim 13, wherein said objective lens includes a first member having an uninterrupted incident and emission surfaces, and a second member to be attached to said first member so as to form said annular groove and ridge respectively,
   said second member being formed of the same material as said first member.

* * * * *

UNITED STATES PATENT AND TRADEMARK OFFICE
CERTIFICATE OF CORRECTION

PATENT NO. : 6,134,055                                                                           Page 1 of 1
DATED : October 17, 2000
INVENTOR(S) : Koike It is certified that error appears in the above-identified patent and that said Letters Patent is hereby corrected as shown below:

<u>Claim 11,</u>
Line 7, change "baying" to -- having --.

Signed and Sealed this

Second Day of October, 2001

Attest:

*Nicholas P. Godici*

NICHOLAS P. GODICI
*Attesting Officer*                    *Acting Director of the United States Patent and Trademark Office*